United States Patent [19]

Oguro

[11] Patent Number: 5,615,056
[45] Date of Patent: Mar. 25, 1997

[54] APPARATUS FOR RECORDING AND REPRODUCING A DIGITAL VIDEO AND AUDIO SIGNAL

[75] Inventor: Masaki Oguro, Tokyo, Japan

[73] Assignee: Sony Corporation, Tokyo, Japan

[21] Appl. No.: 159,455

[22] Filed: Nov. 30, 1993

[30] Foreign Application Priority Data

Dec. 4, 1992 [JP] Japan ..................................... 4-325618
Apr. 22, 1993 [JP] Japan ..................................... 5-096001

[51] Int. Cl.$^6$ ....................................................... G11B 5/02
[52] U.S. Cl. ................................................. 386/104; 386/95
[58] Field of Search ............................. 360/19.1, 48, 69, 360/36.2; 358/343

[56] References Cited

U.S. PATENT DOCUMENTS

| | | | |
|---|---|---|---|
| 4,338,644 | 7/1982 | Staar | 360/69 X |
| 4,554,599 | 11/1985 | Shiozaki | 360/69 |
| 4,768,106 | 8/1988 | Ito et al. | 360/19.1 X |
| 4,833,549 | 5/1989 | Yoshimoto et al. | 360/19.1 |
| 4,914,527 | 4/1990 | Asai et al. | 360/19.1 X |
| 4,935,824 | 6/1990 | Nakao et al. | 360/48 |
| 5,212,603 | 5/1993 | Hasegaua | 360/77.14 X |

FOREIGN PATENT DOCUMENTS

| | | |
|---|---|---|
| 0410897 | 1/1991 | European Pat. Off. . |
| 0483873 | 5/1992 | European Pat. Off. . |
| WO91/02355 | 2/1991 | WIPO . |

OTHER PUBLICATIONS

SMPTE 247M. *SMPTE Journal* Jul. 1990 pp. 592–600.

*Primary Examiner*—Aristotelis Psitos
*Assistant Examiner*—James T. Wilson
*Attorney, Agent, or Firm*—William S. Frommer; Alvin Sinderbrand

[57] ABSTRACT

Digital video tape recorder for recording and reproducing digital video and audio data in respective tracks in a predetermined format on a record medium. The predetermined format having respective video, audio and subcode areas with each area having a number of sync blocks comprised of a data area in which video, audio and system data, respectively, are recorded. These areas are preceded by a fixed area in which sync block identifying information is recorded. The data area of the subcode area is formed of data packs having a common pack structure and system data provides for automatic control during reproduction and for identifying the recorded digital video and audio data.

42 Claims, 28 Drawing Sheets

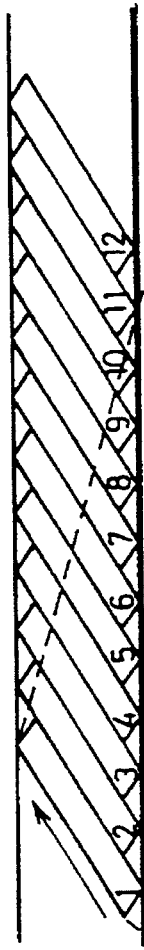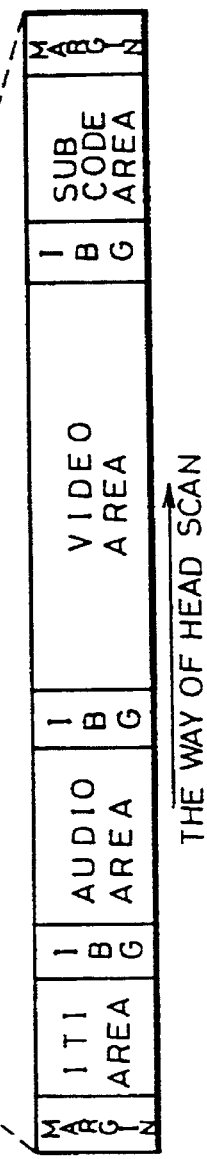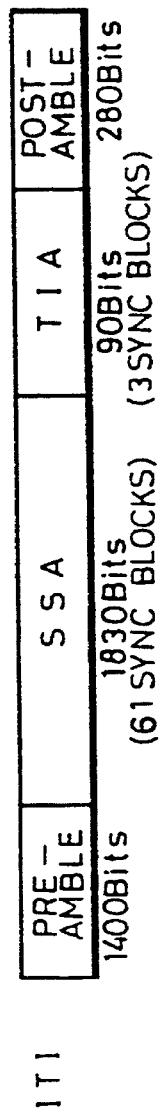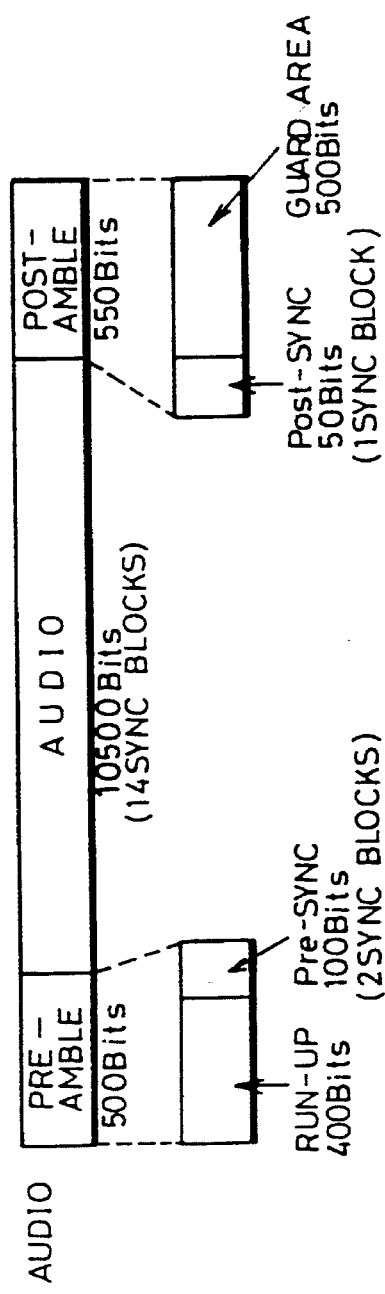
FIG. 1A
FIG. 1B
FIG. 1C

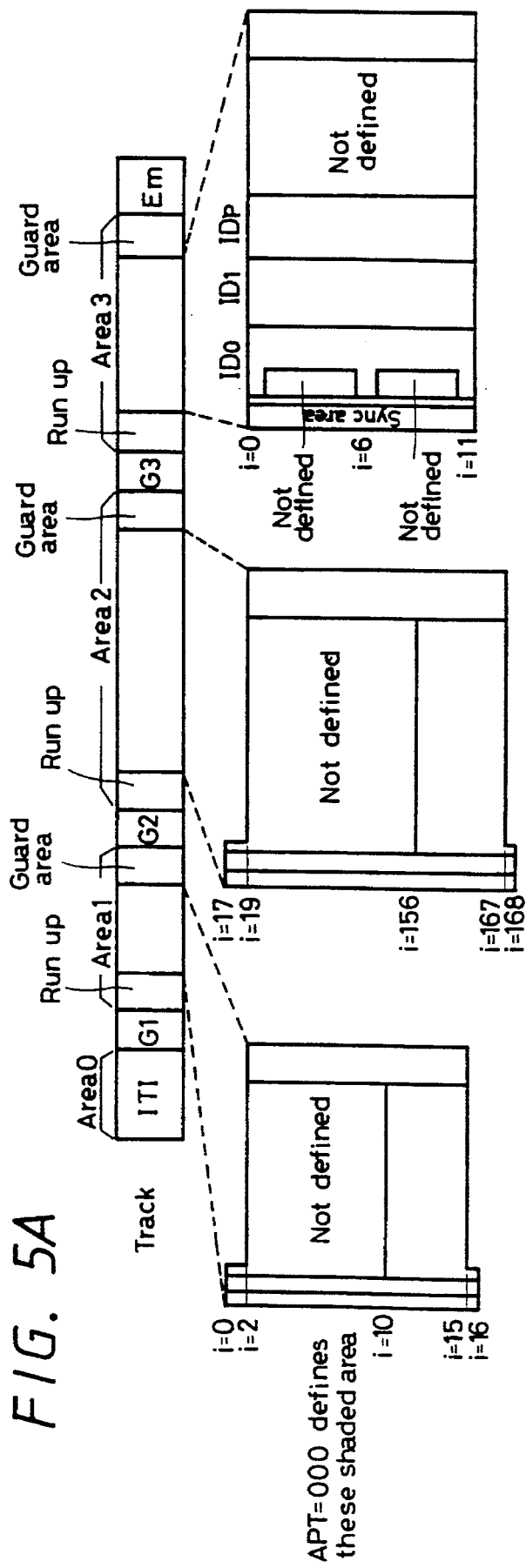
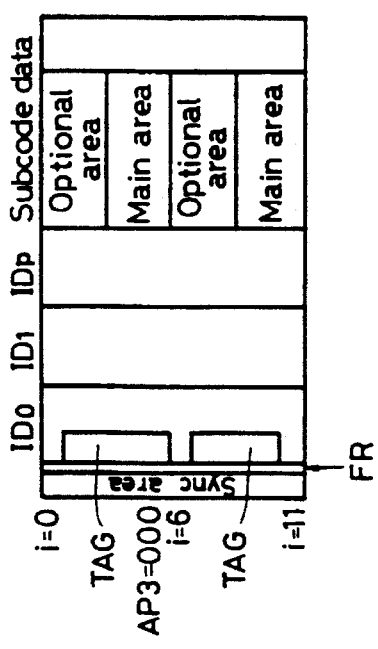
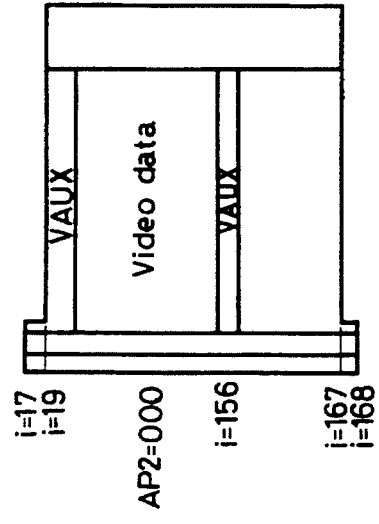
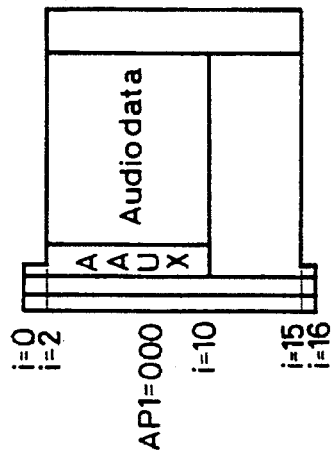
FIG. 5A
FIG. 5B
FIG. 5C
FIG. 5D

☒ : AAUX

▨ : VAUX

Video data structure in one track

FIG. 9

| | 2 Byte | | 3 Byte | | | 77 Byte | 8 Byte |
|---|---|---|---|---|---|---|---|
| | SYNC | SYNC | ID0 | ID1 | IDP | 1 Byte | |
| SYNC NO. 17 (Pre-SYNC) | | | APPL12 APPL11 APPL10 SB00 TRACK3 TRACK2 TRACK1 TRACK0 | SYNC7 SYNC6 SYNC5 SYNC4 SYNC3 SYNC2 SYNC1 SYNC0 | | SP/LP | |
| SYNC NO. 18 (Pre-SYNC) | | | APPL12 APPL11 APPL10 SB00 TRACK3 TRACK2 TRACK1 TRACK0 | SYNC7 SYNC6 SYNC5 SYNC4 SYNC3 SYNC2 SYNC1 SYNC0 | | SP/LP | |
| SYNC NO. 19 (VAUX SYNC) | | | SB03 SB02 SB01 SB00 TRACK3 TRACK2 TRACK1 TRACK0 | SYNC7 SYNC6 SYNC5 SYNC4 SYNC3 SYNC2 SYNC1 SYNC0 | | VAUX | Inner Parity |
| SYNC NO. 20 (VAUX SYNC) | | | SB03 SB02 SB01 SB00 TRACK3 TRACK2 TRACK1 TRACK0 | SYNC7 SYNC6 SYNC5 SYNC4 SYNC3 SYNC2 SYNC1 SYNC0 | | VAUX | Inner Parity |
| SYNC NO. 21 (Video SYNC) | | | SB03 SB02 SB01 SB00 TRACK3 TRACK2 TRACK1 TRACK0 | SYNC7 SYNC6 SYNC5 SYNC4 SYNC3 SYNC2 SYNC1 SYNC0 | | Video Data | Inner Parity |
| ⋮ | | | | | | | |
| SYNC NO. 155 (Video SYNC) | | | SB03 SB02 SB01 SB00 TRACK3 TRACK2 TRACK1 TRACK0 | SYNC7 SYNC6 SYNC5 SYNC4 SYNC3 SYNC2 SYNC1 SYNC0 | | Video Data | Inner Parity |
| SYNC NO. 156 (VAUX SYNC) | | | SB03 SB02 SB01 SB00 TRACK3 TRACK2 TRACK1 TRACK0 | SYNC7 SYNC6 SYNC5 SYNC4 SYNC3 SYNC2 SYNC1 SYNC0 | | VAUX | Inner Parity |
| SYNC NO. 157 (Parity SYNC) | | | APPL12 APPL11 APPL10 SB00 TRACK3 TRACK2 TRACK1 TRACK0 | SYNC7 SYNC6 SYNC5 SYNC4 SYNC3 SYNC2 SYNC1 SYNC0 | | Outer Parity | Inner Parity |
| ⋮ | | | | | | | |
| SYNC NO. 167 (Parity SYNC) | | | APPL12 APPL11 APPL10 SB00 TRACK3 TRACK2 TRACK1 TRACK0 | SYNC7 SYNC6 SYNC5 SYNC4 SYNC3 SYNC2 SYNC1 SYNC0 | | Outer Parity | Inner Parity |
| SYNC NO. 168 (Post-SYNC) | | | APPL12 APPL11 APPL10 SB00 TRACK3 TRACK2 TRACK1 TRACK0 | SYNC7 SYNC6 SYNC5 SYNC4 SYNC3 SYNC2 SYNC1 SYNC0 | | Dummy | |

VIDEO

FIG. 11

SUBCODE

| | 2Byte | | 3Byte | | | 5Byte | 2Byte | |
|---|---|---|---|---|---|---|---|---|
| | SYNC | SYNC | ID0 | ID1 | IDP | Subcode Data | Parity | Parity |
| SYNC No. 0 | | | PR<br>AP3 2<br>AP3 1<br>AP3 0<br>Tr. No16<br>Tr. No17<br>Tr. No18<br>Tr. No19 | Tr. No20<br>Tr. No21<br>Tr. No22<br>BP<br>SYNC 3<br>SYNC 2<br>SYNC 1<br>SYNC 0 | | OPTIONAL | | |
| SYNC No. 1 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | OPTIONAL | | |
| SYNC No. 2 | | | PR<br>RSV<br>RSV<br>RSV<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | OPTIONAL | | |
| SYNC No. 3 | | | PR<br>RSV<br>RSV<br>RSV<br>Tr. No16<br>Tr. No17<br>Tr. No18<br>Tr. No19 | Tr. No20<br>Tr. No21<br>Tr. No22<br>BP<br>SYNC 3<br>SYNC 2<br>SYNC 1<br>SYNC 0 | | Main area | | |
| SYNC No. 4 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | Main area | | |
| SYNC No. 5 | | | PR<br>RSV<br>RSV<br>RSV<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | Main area | | |
| SYNC No. 6 | | | PR<br>AP3 2<br>AP3 1<br>AP3 0<br>Tr. No16<br>Tr. No17<br>Tr. No18<br>Tr. No19 | Tr. No20<br>Tr. No21<br>Tr. No22<br>BP<br>SYNC 3<br>SYNC 2<br>SYNC 1<br>SYNC 0 | | OPTIONAL | | |
| SYNC No. 7 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | OPTIONAL | | |
| SYNC No. 8 | | | PR<br>RSV<br>RSV<br>RSV<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | OPTIONAL | | |
| SYNC No. 9 | | | PR<br>RSV<br>RSV<br>RSV<br>Tr. No16<br>Tr. No17<br>Tr. No18<br>Tr. No19 | Tr. No20<br>Tr. No21<br>Tr. No22<br>BP<br>SYNC 3<br>SYNC 2<br>SYNC 1<br>SYNC 0 | | Main area | | |
| SYNC No. 10 | | | PR<br>RSV<br>RSV<br>RSV<br>Tr. No 8<br>Tr. No 9<br>Tr. No10<br>Tr. No11 | Tr. No12<br>Tr. No13<br>Tr. No14<br>Tr. No15<br>SYNC 3<br>SYNC 2<br>SYNC 1<br>SYNC 0 | | Main area | | |
| SYNC No. 11 | | | PR<br>APT 2<br>APT 1<br>APT 0<br>Tr. No 0<br>Tr. No 1<br>Tr. No 2<br>Tr. No 3 | Tr. No 4<br>Tr. No 5<br>Tr. No 6<br>Tr. No 7<br>SYNC 3<br>SYNC 2<br>SYNC 1<br>SYNC 0 | | Main area | | |

FIG. 12

| Sync block No. | MSB | | | | | | | | | | | | | LSB |
|---|---|---|---|---|---|---|---|---|---|---|---|---|---|---|
| | FR | AP32 | AP31 | AP30 | | | ID0 | | | | ID1 | | | |
| 0 | FR | AP32 | AP31 | AP30 | | | | | | BF | SB3 | SB2 | SB1 | SB0 |
| 1 | FR | RSV | | | | Absolute track No. | | LSB | | SB3 | SB2 | SB1 | SB0 |
| 2 | FR | RSV | | MSB | | Absolute track No. | | | | SB3 | SB2 | SB1 | SB0 |
| 3 | FR | RSV | | | | Absolute track No. | | LSB | | BF | SB3 | SB2 | SB1 | SB0 |
| 4 | FR | RSV | | | | Absolute track No. | | | | SB3 | SB2 | SB1 | SB0 |
| 5 | FR | RSV | | MSB | | Absolute track No. | | LSB | | SB3 | SB2 | SB1 | SB0 |
| 6 | FR | AP32 | AP31 | AP30 | | | | | | BF | SB3 | SB2 | SB1 | SB0 |
| 7 | FR | RSV | | | | Absolute track No. | | LSB | | SB3 | SB2 | SB1 | SB0 |
| 8 | FR | RSV | | MSB | | Absolute track No. | | | | SB3 | SB2 | SB1 | SB0 |
| 9 | FR | RSV | | | | Absolute track No. | | LSB | | BF | SB3 | SB2 | SB1 | SB0 |
| 10 | FR | RSV | | | | Absolute track No. | | | | SB3 | SB2 | SB1 | SB0 |
| 11 | FR | APT2 | APT1 | APT0 | MSB | | | | | SB3 | SB2 | SB1 | SB0 |

FIG. 14

| Word Name | | MSB | | | | | | | LSB |
|---|---|---|---|---|---|---|---|---|---|
| PC0 | (ITEM) | | | | | | | | |
| PC1 | (DATA) | | | | | | | | |
| PC2 | | | | | | | | | |
| PC3 | | | | | | | | | |
| PC4 | | | | | | | | | |

Pack(Packet) structure

FIG. 15

Upper level code table of Item data

| UPPER | LOWER | |
|---|---|---|
| 0000 | xxxx | CONTROL |
| 0001 | xxxx | TITLE |
| 0010 | xxxx | CHAPTER |
| 0011 | xxxx | PART |
| 0100 | xxxx | PROGRAM |
| 0101 | xxxx | AAUX |
| 0110 | xxxx | VAUX |
| 0111 | xxxx | CAMERA |
| 1000 | xxxx | LINE |
| 1001 ⋮ 1110 | xxxx ⋮ xxxx | RESERVED |
| 1111 | aaaa | SOFT MODE |
| 1111 | 1111 | NO INFORMATION | aaaa: 0000~1110
xxxx: 0000~1111

FIG. 16

| UPPER / LOWER | 0000 CONTROL | 0001 TITLE | 0010 CHAPTER | 0011 PART | 0100 PROGRAM | 0101 AAUX | 0110 VAUX | 0111 CAMERA | 1000 LINE | 1001 1110 | 0111 SOFT MODE |
|---|---|---|---|---|---|---|---|---|---|---|---|
| 0000 | CASSETTE ID | TOTAL TIME | TOTAL TIME | TOTAL TIME | TOTAL TIME | SOURCE | SOURCE | CONSUMER CAMERA 1 | LINE HEADER | | MAKER CODE |
| 0001 | TAPE LENGTH | REMAIN TIME | REMAIN TIME | REMAIN TIME | REMAIN TIME | SOURCE CONTROL | SOURCE CONTROL | CONSUMER CAMERA 2 | Y | | OPTION |
| 0010 | TIMER REC DATE | CHAPTER TOTAL No. | CHAPTER No. | PART No. | REC DTIME | REC DATE | REC DATE | RSV | R-Y | | OPTION |
| 0011 | TIMER REC S/S | TIME CODE | TIME CODE | TIME CODE | TIME CODE | REC TIME | REC TIME | LENS | B-Y | | OPTION |
| 0100 | REC START POINT | BINARY GROUP | BINARY GROUP | BINARY GROUP | BINARY GROUP | BINARY GROUP | BINARY GROUP | GAIN | RSV | | OPTION |
| 0101 | REC START POINT | CASSETTE No. | RSV | RSV | RSV | T.B.D | CLOSED CAPTION | PEDESTAL | R | | OPTION |
| 0110 | TAG.ID No. | SOFT ID | RSV | RSV | RSV | RSV | RSV | GAMMA | G | | OPTION |
| 0111 | TOPIC /PAGE HEADER | SOFT ID | RSV | RSV | RSV | RSV | TELE TEXT | DETAIL | B | RSV | OPTION |
| 1000 | TEXT HEADER | TEXT HEADER | TEXT HEADER | TEXT HEADER | TEXT HEADER | TEXT HEADER | TEXT HEADER | TEXT HEADER | TEXT HEADER | | OPTION |
| 1001 | TEXT | TEXT | TEXT | TEXT | TEXT | TEXT | TEXT | TEXT | TEXT | | OPTION |
| 1010 | TAG | TITLE START | CHAPTER START | PART START | PROGRAM START | RSV | RSV | SHUTTER | RSV | | OPTION |
| 1011 | TAG | TITLE START | CHAPTER START | PART START | PROGRAM START | RSV | RSV | KNEE | RSV | | OPTION |
| 1100 | RSV | REEL ID | RSV | RSV | RSV | RSV | RSV | FLARE | RSV | | OPTION |
| 1101 | RSV | REEL ID | RSV | RSV | RSV | RSV | RSV | SHADING | RSV | | OPTION |
| 1110 | ZONE END | TITLE END | CHAPTER END | PART END | PROGRAM END | RSV | RSV | RSV | RSV | | OPTION |
| 1111 | ZONE END | TITLE END | CHAPTER END | PART END | PROGRAM END | RSV | RSV | RSV | RSV | | NO INFO |

 MIC Main area          VAUX Main area

 Subcode Main area      AAUX Main area

The PACK Header table

FIG. 17

| Pack No. \ Track No. | 1 | 2 | 3 | 4 | 5 | 6 | 7 | 8 | 9 | 10 |
|---|---|---|---|---|---|---|---|---|---|---|
| 10 | 55 |    | 55 |    | 55 |    | 55 |    | 55 |    |
| 9  | 54 |    | 54 |    | 54 |    | 54 |    | 54 |    |
| 8  | 53 |    | 53 |    | 53 |    | 53 |    | 53 |    |
| 7  | 52 | 55 | 52 | 55 | 52 | 55 | 52 | 55 | 52 | 55 |
| 6  | 51 | 54 | 51 | 54 | 51 | 54 | 51 | 54 | 51 | 54 |
| 5  | 50 | 53 | 50 | 53 | 50 | 53 | 50 | 53 | 50 | 53 |
| 4  |    | 52 |    | 52 |    | 52 |    | 52 |    | 52 |
| 3  |    | 51 |    | 51 |    | 51 |    | 51 |    | 51 |
| 2  |    | 50 |    | 50 |    | 50 |    | 50 |    | 50 |

AUDIO PACK DATA STRUCTURE

FIG. 18A

SOURCE

| | MSB | | | | | | | LSB |
|---|---|---|---|---|---|---|---|---|
| PC0 | 0 | 1 | 0 | 1 | 0 | 0 | 0 | 0 |
| PC1 | LF | 1 | AF SIZE | | | | | |
| PC2 | CH | | | 1 | 1 | 1 | 1 | 1 |
| PC3 | 1 | 1 | 50/60 | | STYPE | | | |
| PC4 | EF | TC | SMP | | | QU | | |

FIG. 18B

SOURCE CONTROL

| | MSB | | | | | | | LSB |
|---|---|---|---|---|---|---|---|---|
| PC0 | 0 | 1 | 0 | 1 | 0 | 0 | 0 | 1 |
| PC1 | Reserved | | | | | | | |
| PC2 | REC ST | REC END | 1 | 1 | 1 | 1 | 1 | 1 |
| PC3 | DRF | SPEED | | | | | | |
| PC4 | 1 | GENRE CATEGORY | | | | | | |

FIG. 18C

REC DATE

| | MSB | | | | | | | LSB |
|---|---|---|---|---|---|---|---|---|
| PC0 | 0 | 1 | 0 | 1 | 0 | 0 | 1 | 0 |
| PC1 | DS | TM | TIME ZONE | | | | | |
| PC2 | 1 | 1 | DAY | | | | | |
| PC3 | WEEK | | MONTH | | | | | |
| PC4 | YEAR | | | | | | | |

FIG. 18D

REC TIME

| | MSB | | | | | | | LSB |
|---|---|---|---|---|---|---|---|---|
| PC0 | 0 | 1 | 0 | 1 | 0 | 0 | 1 | 1 |
| PC1 | S2 | S1 | TENS of FRAMES | | UNITS of FRAMES | | | |
| PC2 | S3 | | TENS of SECONDS | | UNITS of SECOND | | | |
| PC3 | S4 | | TENS of MINUTES | | UNITS of MINUTES | | | |
| PC4 | S6 | S5 | TENS of HOURS | | UNITS of HOURS | | | |

FIG. 18E

BINARY GROUP

| | MSB | | | | | | | LSB |
|---|---|---|---|---|---|---|---|---|
| PC0 | 0 | 1 | 1 | 0 | 0 | 1 | 0 | 0 |
| PC1 | BINARY GROUP 2 | | | | BINARY GROUP 1 | | | |
| PC2 | BINARY GROUP 4 | | | | BINARY GROUP 3 | | | |
| PC3 | BINARY GROUP 6 | | | | BINARY GROUP 5 | | | |
| PC4 | BINARY GROUP 8 | | | | BINARY GROUP 7 | | | |

| | MSB | | | | | | | LSB |
|---|---|---|---|---|---|---|---|---|
| PC0 | 0 | 1 | 0 | 1 | 0 | 1 | 0 | 1 |
| PC1 | | | | | | | | |
| PC2 | | | | T.B.D | | | | |
| PC3 | | | | | | | | |
| PC4 | | | | | | | | |

PACKs for Main area of AAUX

FIG. 19

| TRACK NO. → | 1 | 2 | 3 | 4 | 5 | 6 | 7 | 8 | 9 | 10 |
|---|---|---|---|---|---|---|---|---|---|---|
| | 65 | | 65 | | 65 | | 65 | | 65 | |
| | 64 | | 64 | | 64 | | 64 | | 64 | |
| | 63 | | 63 | | 63 | | 63 | | 63 | |
| | 62 | | 62 | | 62 | | 62 | | 62 | |
| 40 | 61 | | 61 | | 61 | | 61 | | 61 | |
| | 60 | | 60 | | 60 | | 60 | | 60 | |
| | | | | | | | | | | |
| | | | | | | | | | | |
| 35 | | | | | | | | | | |
| | | | | | | | | | | |
| | | | | | | | | | | |
| 30 | | | | | | | | | | |
| | | | | | | | | | | |
| 25 | | | | | | | | | | |
| | | | | | | | | | | |
| 20 | | | | | | | | | | |
| | | | | | | | | | | |
| 15 | | | | | | | | | | |
| | | | | | | | | | | |
| 10 | | | | | | | | | | |
| | | | | | | | | | | |
| 5 | | 65 | | 65 | | 65 | | 65 | | 65 |
| | | 64 | | 64 | | 64 | | 64 | | 64 |
| | | 63 | | 63 | | 63 | | 63 | | 63 |
| | | 62 | | 62 | | 62 | | 62 | | 62 |
| | | 61 | | 61 | | 61 | | 61 | | 61 |
| 0 | | 60 | | 60 | | 60 | | 60 | | 60 |

PACK NO.

VIDEO PACK DATA STRUCTURE

FIG. 20A

SOURCE

| | MSB | | | | | | | LSB |
|---|---|---|---|---|---|---|---|---|
| PC0 | 0 | 1 | 1 | 0 | 0 | 0 | 0 | 0 |
| PC1 | TENS of TV CHANNEL | | | | UNITS of TV CHANNEL | | | |
| PC2 | 1 | EN | | CLF | | HUNDREDS of TV CHANNEL | | |
| PC3 | SOURCE CODE | | 50/50 | | STYPE | | | |
| PC4 | TUNER CATEGORY | | | | | | | |

FIG. 20B

SOURCE CONTROL

| | MSB | | | | | | | LSB |
|---|---|---|---|---|---|---|---|---|
| PC0 | 0 | 1 | 1 | 0 | 0 | 0 | 0 | 1 |
| PC1 | Reserved | | | | | | | |
| PC2 | 1 | 1 | 1 | 1 | DISP | | | |
| PC3 | FF | 1 | 1 | 1 | 1 | 1 | BCSYS | |
| PC4 | 1 | GENRE CATEGORY | | | | | | |

FIG. 20C

REC DATE

| | MSB | | | | | | | LSB |
|---|---|---|---|---|---|---|---|---|
| PC0 | 0 | 1 | 1 | 0 | 0 | 0 | 1 | 0 |
| PC1 | DS | TM | TIME ZONE | | | | | |
| PC2 | 1 | 1 | DAY | | | | | |
| PC3 | WEEK | | | MONTH | | | | |
| PC4 | YEAR | | | | | | | |

FIG. 20D

REC TIME

| | MSB | | | | | | | LSB |
|---|---|---|---|---|---|---|---|---|
| PC0 | 0 | 1 | 1 | 0 | 0 | 0 | 1 | 1 |
| PC1 | S2 | S1 | TENS of FRAMES | | UNITS of FRAMES | | | |
| PC2 | S3 | TENS of SECONDS | | | UNITS of SECOND | | | |
| PC3 | S4 | TENS of MINUTES | | | UNITS of MINUTES | | | |
| PC4 | S6 | S5 | TENS of HOURS | | UNITS of HOURS | | | |

FIG. 20E

BINARY GROUP

| | MSB | | | | | | | LSB |
|---|---|---|---|---|---|---|---|---|
| PC0 | 0 | 1 | 1 | 0 | 0 | 1 | 0 | 0 |
| PC1 | BINARY GROUP 2 | | | | BINARY GROUP 1 | | | |
| PC2 | BINARY GROUP 4 | | | | BINARY GROUP 3 | | | |
| PC3 | BINARY GROUP 6 | | | | BINARY GROUP 5 | | | |
| PC4 | BINARY GROUP 8 | | | | BINARY GROUP 7 | | | |

FIG. 20F

CLOSED CAPTION

| | MSB | | | | | | | LSB |
|---|---|---|---|---|---|---|---|---|
| PC0 | 0 | 1 | 1 | 0 | 0 | 1 | 0 | 1 |
| PC1 | 1st FIELD Line 21 Upper BYTE | | | | | | | |
| PC2 | 1st FIELD Line 21 Lower BYTE | | | | | | | |
| PC3 | 2nd FIELD Line 21 Upper BYTE | | | | | | | |
| PC4 | 2nd FIELD Line 21 Lower BYTE | | | | | | | |

PACKs for Main area of VAUX

FIG. 21A

TIME CODE

| | MSB | | | | | | | LSB |
|---|---|---|---|---|---|---|---|---|
| PC0 | 0 | 0 | 0 | 1 | 0 | 0 | 1 | 1 |
| PC1 | S2 | S1 | TENS of FRAMES | | UNITS of FRAMES | | | |
| PC2 | S3 | | TENS of SECONDS | | UNITS of SECOND | | | |
| PC3 | S4 | | TENS of MINUTES | | UNITS of MINUTES | | | |
| PC4 | S6 | S5 | TENS of HOURS | | UNITS of HOURS | | | |

FIG. 21B

BINARY GROUP

| | MSB | | | | | | | LSB |
|---|---|---|---|---|---|---|---|---|
| PC0 | 0 | 1 | 1 | 0 | 0 | 1 | 0 | 0 |
| PC1 | BINARY GROUP 2 | | | | BINARY GROUP 1 | | | |
| PC2 | BINARY GROUP 4 | | | | BINARY GROUP 3 | | | |
| PC3 | BINARY GROUP 6 | | | | BINARY GROUP 5 | | | |
| PC4 | BINARY GROUP 8 | | | | BINARY GROUP 7 | | | |

FIG. 21C

PART NO.

| | MSB | | | | | | | LSB |
|---|---|---|---|---|---|---|---|---|
| PC0 | 0 | 0 | 1 | 1 | 0 | 0 | 1 | 0 |
| PC1 | TENS of CHNO | | | | UNITS of CHNO | | | |
| PC2 | TENS of PNO | | | | UNITS of PNO | | | |
| PC3 | | | | | | | | |
| PC4 | | | | | | | | |

FIG. 21D

CHAPTER START

| | MSB | | | | | | | LSB |
|---|---|---|---|---|---|---|---|---|
| PC0 | 0 | 0 | 1 | 0 | 1 | 0 | 1 | 1 |
| PC1 | | | | | | | LSB | TT |
| PC2 | -----TRACK NO.----- | | | | | | | |
| PC3 | MSB -----(BINARY)----- | | | | | | | |
| PC4 | TEXT | GENRE CATEGORY | | | | | | |

PACKs for Main area of Subcode

FIG. 22A

CASSETTE ID

| | MSB | | | | | | | LSB |
|---|---|---|---|---|---|---|---|---|
| PC0 | 0 | 0 | 0 | 0 | 0 | 0 | 0 | 0 |
| PC1 | ME | 1 | 1 | MULTI-BYTES | | | MEM TYPE | |
| PC2 | MEM SIZE of SPACE 0 | | | | MEM SIZE of the LAST BANK in SPACE 1 | | | |
| PC3 | MEM BANK NO. of SPACE 1 | | | | | | | |
| PC4 | THICK 1 | | | | THICK 1/10 | | | |

FIG. 22B

TAPE LENGTH

| | MSB | | | | | | | LSB |
|---|---|---|---|---|---|---|---|---|
| PC0 | 0 | 0 | 0 | 0 | 0 | 0 | 0 | 1 |
| PC1 | ← | — | — | — | — | — | LSB → | 1 |
| PC2 | — | — | — | TAPE LENGTH | | — | — | — |
| PC3 | ← MSB | — | — | (BINARY) | | — | — | — |
| PC4 | 1 | 1 | 1 | 1 | 1 | 1 | 1 | 1 |

FIG. 22C

TTTLE END

| | MSB | | | | | | | LSB |
|---|---|---|---|---|---|---|---|---|
| PC0 | 0 | 0 | 0 | 1 | 1 | 1 | 1 | 1 |
| PC1 | ← | — | — | — | — | — | LSB → | BF |
| PC2 | — | — | — | TRACK NO. | | — | — | — |
| PC3 | ← MSB | — | — | (BINARY) | | — | — | — |
| PC4 | SL | RE | 1 | 1 | 1 | 1 | 1 | 1 |

PACKs for Main area of MIC

Tape (TDP=m)

fixed length PACK structure

MIC (TDP=n)

variable length PACK structure

FIG. 27A-1
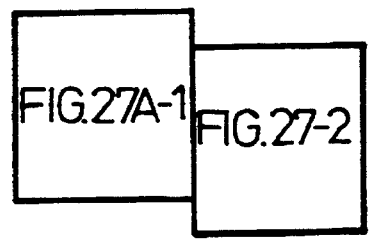
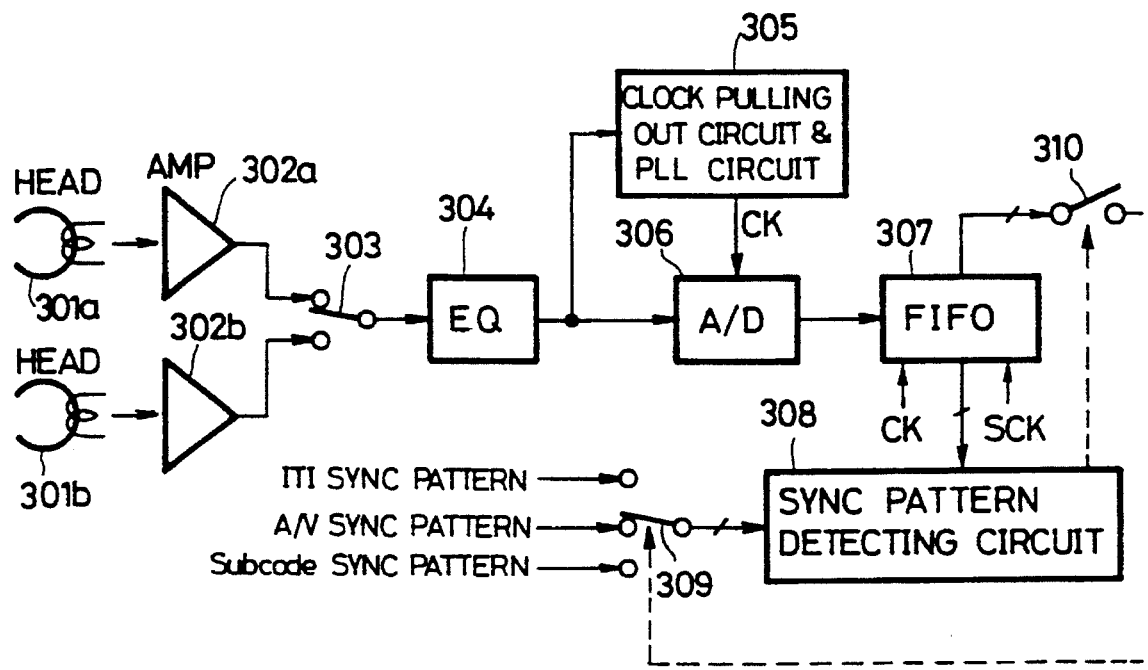
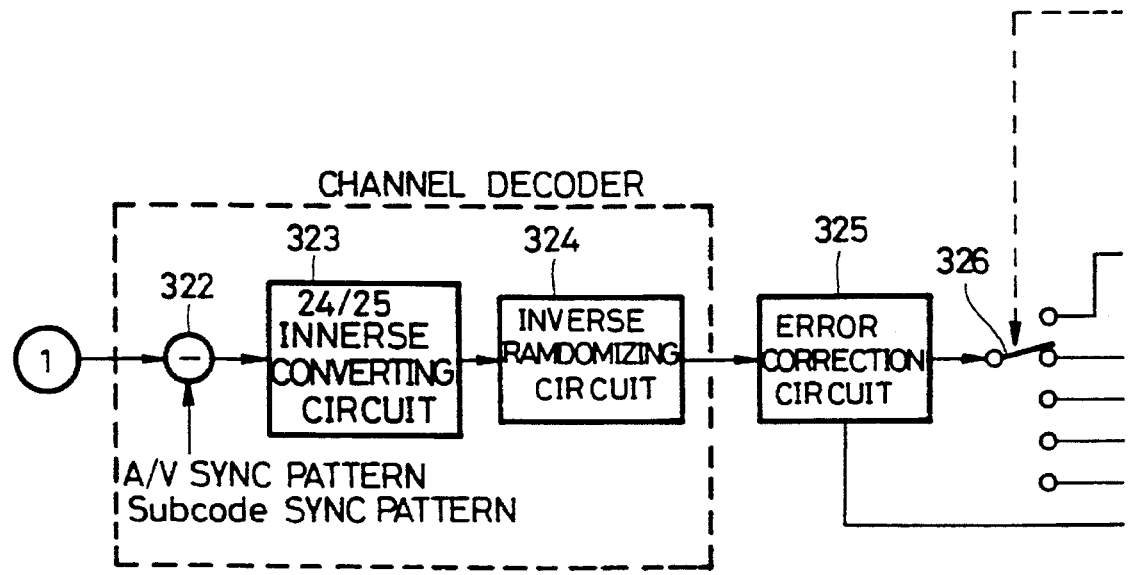

APPARATUS FOR RECORDING AND REPRODUCING A DIGITAL VIDEO AND AUDIO SIGNAL

BACKGROUND OF THE INVENTION

The present invention relates to a digital video tape recorder and, more particularly, to apparatus for recording and reproducing a video signal and an audio signal in the form of coded signals on a recording medium.

Digital video tape recorders which record and reproduce video and audio signals in coded form are known in the art. These digital video tape recorders often employ efficient coding techniques for compressing the amount of data to be recorded. Among these techniques, discrete cosine transformation (DCT), is commonly employed. It has been proposed that identification (ID) signals be used to distinguish between various recording and reproducing modes including standard play (SP) mode and long play (LP) mode. However, since the data recording format that may be employed is limiting, various types of data in various types of structures cannot be recorded and reproduced easily.

Digital audio tape (DAT) recorders attempt to solve this problem with respect to audio signals. In a typical DAT data structure, an identification area of 2 bits×2 areas (4 bits) is provided at every synchronizing period in the main data area. Data representing, for example, the presence or absence of emphasis, sampling frequency, number of channels and quantization method, can be recorded or reproduced with the identification data. The identification areas thus may identify what the accompanying data represents.

In the above-mentioned DAT data structure, so-called subcode areas are provided at respective ends of each track recorded on the record tape. Identification data accompanying the audio signals are recorded on and reproduced from these subcode areas. Eight blocks of such data are recorded in the subcode area. Of these eight blocks, even-numbered blocks of eight bytes each contain seven bytes of data and one byte of parity code. Upon reproduction of the even-numbered blocks, error correction is accomplished by utilizing what has become known in the art as inside parity and outside parity. Odd-numbered blocks contain four bytes of other identification data, and upon reproduction, error correction is carried out only by the outside parity. Thus, the ID area, the even-numbered blocks and the odd-numbered blocks of the main data area have different data structures. Therefore, the software necessary to process this data is complicated.

Further, since the timing with which the aforementioned DAT data in the ID area, the even-numbered blocks and the odd-numbered blocks is recorded and reproduced is different due to the different data structures, a memory, such as a random access memory (RAM), is necessary to record and reproduce the audio signals. Furthermore, when new DAT equipment is developed, the software utilized with existing DAT recorders might not be able to be used and new software is expensive to develop.

Thus, mere modification of the data structure used in the aforementioned digital audio tape recorder to allow for recording and reproduction of video data would be unsatisfactory to a user since this VTR would be capable of only performing "basic" functions and would not be capable of performing a multitude of other functions which have become standard in video tape recorders and in addition, would not contain features present in the digital video tape recorder of the present invention.

OBJECTS OF THE INVENTION

Therefore, it is an object of the present invention to provide an apparatus for recording and reproducing digital video and audio data which overcomes the shortcomings of the above described devices.

Another object of the present invention is to provide apparatus for recording and reproducing digital video and audio data whose data structure of the recorded and reproduced information may easily be modified.

A further object of this invention is to provide apparatus for recording and reproducing digital video and audio signals whose software is not unduly complicated.

An additional object of this invention is provide apparatus for recording and reproducing digital video and audio signals which does not require an extra memory for timing purposes.

Still another object of this invention is to provide a data structure of a coded signal containing digital video and audio data and areas for storing various system data, which may easily be modified, to assist in the recording and reproducing operations of the video tape recorder of the present invention.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, digital video and audio data are recorded on a record medium in the form of a coded signal having a recording format comprised of respective video, audio and subcode areas with each area having a number of sync blocks comprised of a data area in which video, audio and system data, respectively, are recorded. Each of these data areas are preceded by a fixed area in which sync block identifying information is recorded. The data area of the subcode area is formed of data packs having a common pack structure (e.g. of a fixed data length) and the system data provides for automatic control during a recording mode and playback mode and for identifying the recorded digital video and audio data.

As one aspect of the present invention, the respective video and audio areas of the predetermined format include video auxiliary areas, which may be located in different sync blocks than the video data, and audio auxiliary areas, which may precede the audio data in each sync block, respectively, in which system data are provided. The video auxiliary areas and the audio auxiliary areas are formed of data packs having the common pack structure.

As another aspect of the present invention, the fixed area which precedes the system data in the subcode area includes track structure identification data identifying the predetermined format of the recorded track and may include an absolute track number identifying the track on the record medium relative to the beginning of the record medium in which the system data is recorded.

As yet a further aspect of the present invention, the housing of the record medium on which the digital video and audio data are recorded contains a memory chip for storing system data which identifies the data recorded on the record medium and the memory in the memory chip is formed of data packs having the common pack structure.

As a feature of this aspect, the memory chip in the housing can additionally store user supplied text data which is formed of modified data packs which have a variable length pack structure.

As yet another aspect of the present invention, an ITI area is included in the predetermined format which contains timing information for achieving reliable rerecording of the reproduced data and which also may contain track structure identification data which identifies the predetermined format of the recorded track.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 1A to 1E are schematic diagrams showing the format of various portions of the coded signals recorded on and reproduced from the magnetic tape by the present invention;

FIGS. 5A to 5D portray the data structure of various areas of the recorded signal on a track corresponding to the various application ID signals recorded in each area;

FIG. 9 illustrates in greater detail the data structure of the video area shown in FIG. 8;

FIG. 11 illustrates the data structure of the subcode area of a record track in accordance with this invention;

FIG. 12 illustrates the data structure of bytes ID0 and ID1 of the subcode sync areas shown in FIG. 11;

FIG. 14 illustrates the data structure of a pack used as the basic building block in the video auxiliary (VAUX), audio auxiliary (AAUX) and subcode data areas;

FIG. 15 is a table showing the available groups of system data;

FIG. 16 is a table showing pack headers of the groups shown in FIG. 15;

FIG. 17 is a table showing a frame of audio pack data structure;

FIGS. 18A to 18F illustrate the data structure of pack headers stored in the audio auxiliary (AAUX) area;

FIG. 19 is a table showing a frame of video pack data structure;

FIGS. 20A to 20F illustrate the data structure of the pack headers stored in the video auxiliary (VAUX) area;

FIGS. 21A to 21D illustrate the data structure of the pack headers stored in the subcode data area;

FIGS. 22A to 22C illustrate the data structure of the pack headers stored in the MIC area;

DETAILED DESCRIPTION OF CERTAIN PREFERRED EMBODIMENTS

Figure 1D:
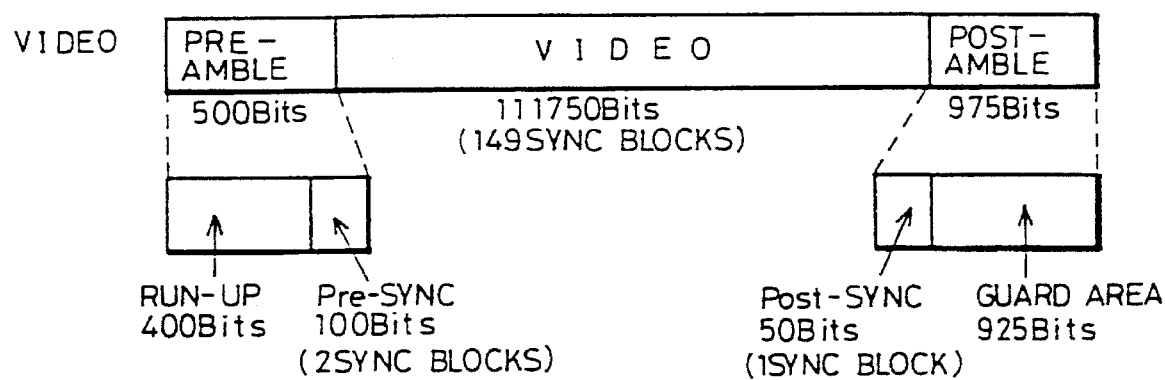

Referring now to the drawings, FIG. 1A schematically illustrates a preferred recording format of one track recorded on, for example, a record tape. In a preferred embodiment, the data which is recorded in this track is digital video data, wherein ten tracks are used to record a single frame in the NTSC system and twelve tracks are used to record a single frame in the PAL system. As shown in FIG. 1A, margins for edit are provided at respective ends of the track. During recording of one track, an insert and track information (ITI) area is recorded at the beginning portion of the track followed by an audio area, a video area and a subcode area. Between the four recorded areas, inter block gaps (IBG) are formed. As shown in FIGS. 1B to 1E, the ITI, audio, video and subcode areas each contain a pre-amble area at the beginning and a post-amble area at the end of the respective area. The pre-ambles and post-ambles prevent data from remaining unerased when re-recording of data on this track occurs.

FIG. 1B shows in greater detail the ITI area in one recording track. As shown, the ITI area contains a pre-amble, a start sync area (SSA), a track information area (TIA) and a post-amble. The start sync area contains data to accomplish reliable placement of the head during recording and reproducing, various methods of such head placement being known in the art. The track information area contains synchronizing data, application identification (ID) data, recording mode data and pilot frame data, which are described in greater detail below.

Figure 1E:
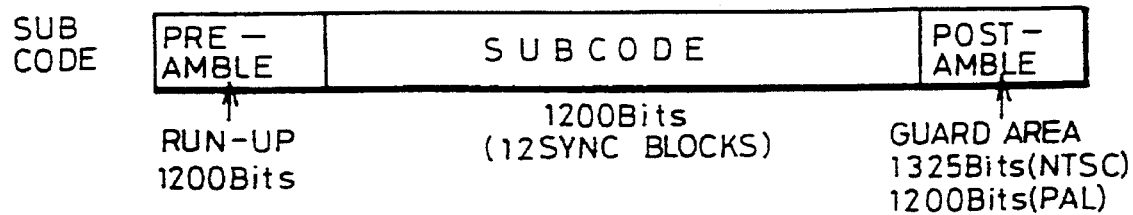

The audio, video and subcode areas of a track, as shown in FIGS. 1C to 1E, each includes a pre-amble and a post-amble and are further discussed below.

Figure 2:
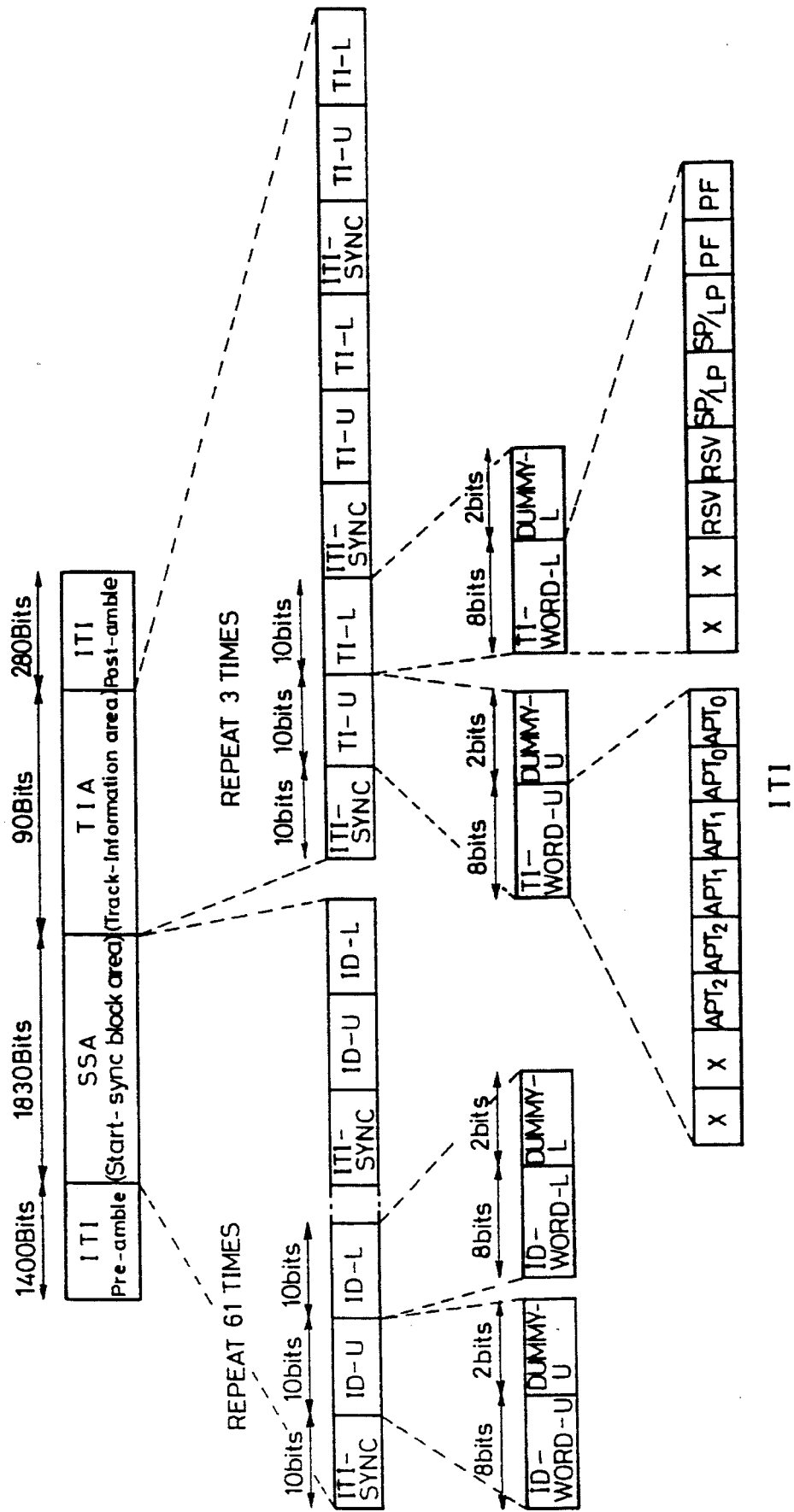
FIG. 2 is a schematic diagram showing in greater detail the format of the insert and track information (ITI) area of FIG. 1B.
Figure 3:
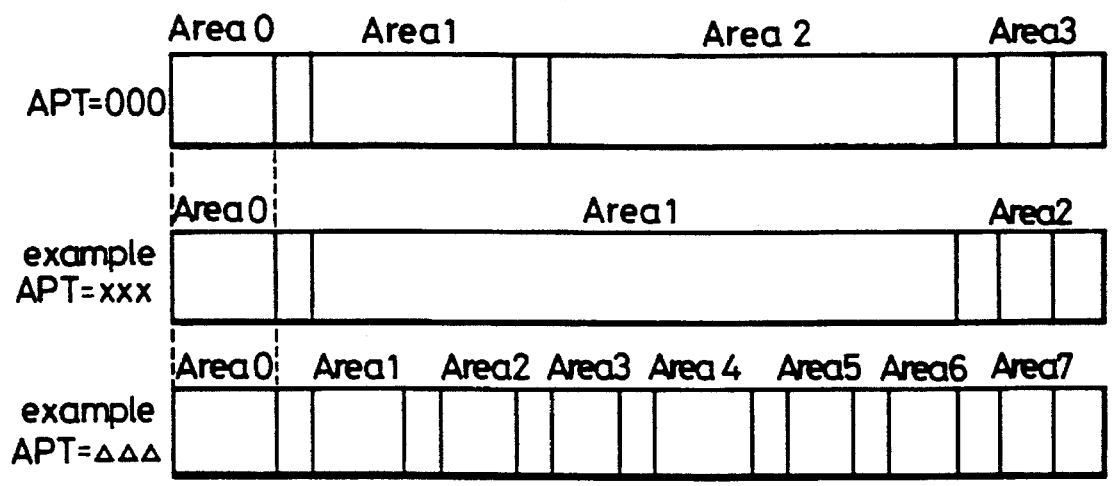
FIG. 3 is a schematic diagram showing various data structures which may be used by the present invention to record coded signals.

FIG. 2 illustrates the preferred format of the ITI area. As mentioned above, the ITI area contains a track information area (TIA) which contains a sync pattern (ITI-SYNC) followed by two 10-bit track information words (TI-U and TI-L), with this arrangement being repeated three times in the track information area. The information word TI-U is formed of an 8-bit word (TI-WORD-U) followed by two dummy bits (DUMMY-U); and the 8-bit word contains an application ID signal APT. Signal APT is three bits long ($APT_0$, $APT_1$, $APT_2$) and is repeated, as shown. This signal defines the data structure of a track. The data structure of a track may be different for different applications. For example, APT=000 identifies the recorder which recorded this track as a consumer digital video tape recorder. For other applications, such as when the information recorded in the track is computer data, the value of APT is different. FIG. 3 illustrates three different examples of data structure identified by different values of APT. When APT=000, the track contains four discrete data recording areas, Area 0 through Area 3. When APT=xxx (where xxx may be a preselected value), for example, the track contains three areas, Area 0–2; and when APT=ΔΔΔ (where ΔΔΔ may be yet another preset value) the track contains eight discrete data recording areas.

Figure 4:
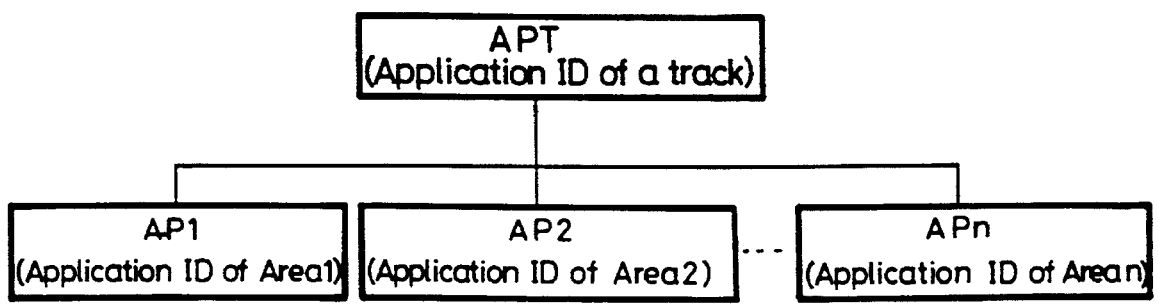
FIG. 4 is a schematic diagram of the hierarchy of Application ID signals provided in the ITI data of FIG. 2.

In the preferred embodiment, although application ID signal APT defines the data structure of a track, it does not define the data structure of each individual area (Area 0, Area 1, Area 2, etc.). Instead, application ID signal AP1 is recorded in an identification byte of a "five byte sync area" (discussed below) in Area 1 to define the data structure of Area 1, application ID signal AP2 is recorded in an identification byte of the five byte sync area in Area 2 to define the data structure of Area 2 and application ID signal AP3 is recorded in an identification byte of the five byte sync area in Area 3 to define the data structure of Area 3. FIG. 4 shows the hierarchy of these various application ID signals.

FIG. 5A portrays the data structure of Areas 1–3 when APT=000 and application ID signals AP1 through AP3 are undefined. In particular, the data structure of the shaded areas included in Area 1, Area 2 and Area 3, respectively, are predetermined when APT=000, but the data structure in the unshaded areas remain to be set, or defined, by application ID signals AP1, AP2 and AP3. FIG. 5B shows the structure of the audio area when AP1=000; FIG. 5C shows the structure of the video area when AP2=000; and FIG. 5D shows the structure of the subcode area when AP3=000. Application ID signals AP1, AP2 and AP3 are all equal to 000 when the tracks are recorded by a consumer digital video tape recorder. AP1, AP2 and AP3 are further described below.

Returning to FIG. 2, the track information area TIA of the insert and track information area (ITI) also contains bits SP/LP and PF repeated twice in the 8-bit word (TI-WORD-L). Upon recording, bit SP/LP designates whether the video and audio signals are being recorded in a standard play (SP) recording mode or a long play (LP) recording mode. Upon reproduction, bit SP/LP identifies the recording mode in which the signal had been recorded. Bit PF designates the pilot frame to indicate whether the track contains "A" frame data or "B" frame data and is used for compression and decompression processing. Such processing forms no part of the present invention per se.

By repeating the application ID signal APT and bits SP/LP and PF several times in the track information area, the inability to detect these signals is minimized and relatively simple detection techniques can be used, such as majority logic or the like. Bits labeled "X" and "RSV" in the track information words TI-WORD-U and TI-WORD-L presently are unused and are reserved for future use.

Figure 6A:
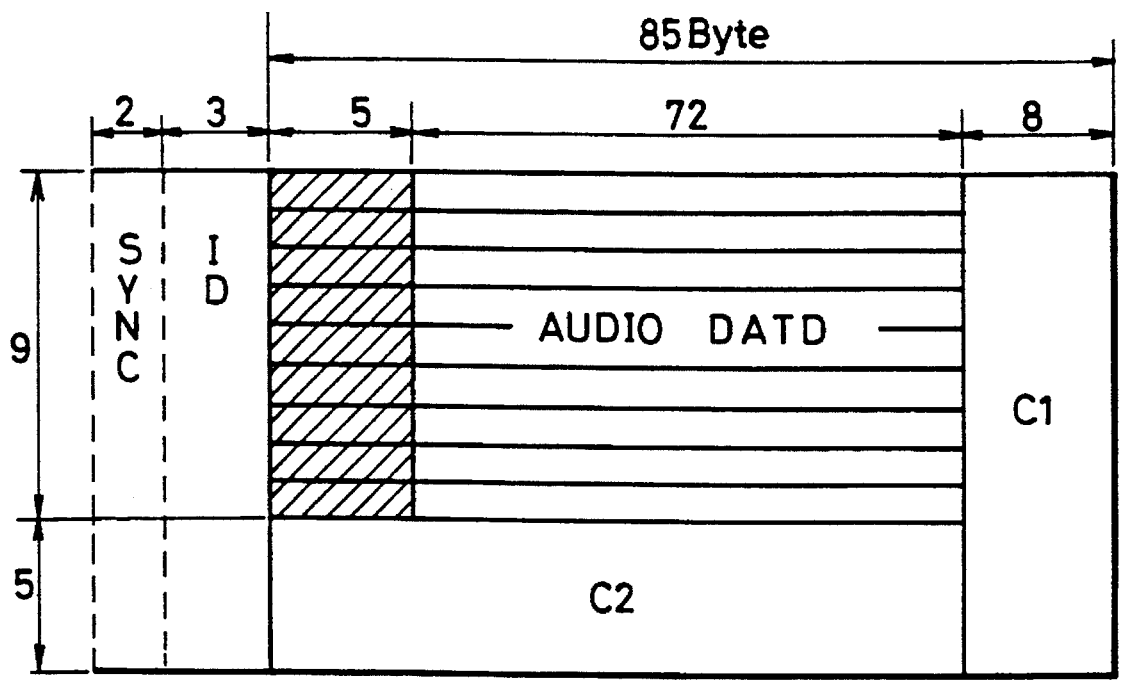
FIGS. 6A and 6B schematically illustrate the data structure of the audio area of a track and a sync block of the audio area.
Figure 6B:
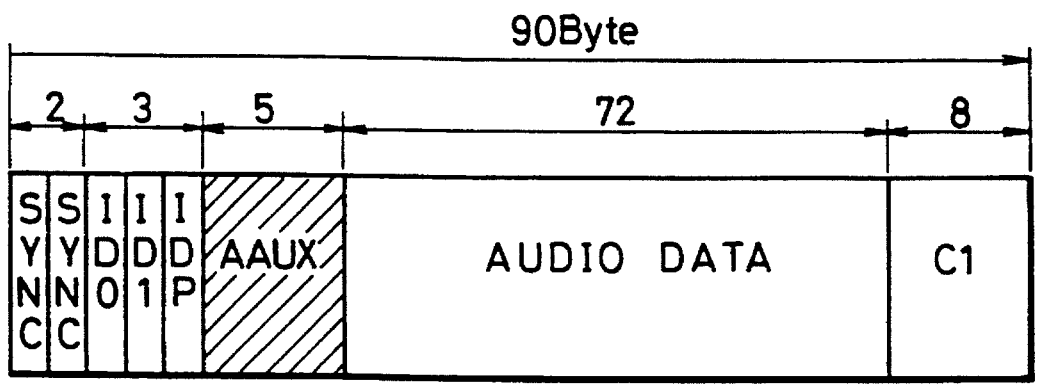

The data structure of the audio area of a track is illustrated in FIGS. 6A and 6B. It is seen from FIG. 1C that the audio area contains 17 sync blocks, and FIG. 6A depicts the data structure of 14 of these 17 sync blocks of the audio area of a track. As shown, nine "audio sync blocks" contain audio data and parity data referred to as "inner parity code", or C1 code for error correction. The audio area also contains five "parity sync blocks" comprised of "outer parity code", or C2 code for error correction of the columns of bits depicted in FIG. 6A. FIG. 6B shows the data structure of one audio sync block. As shown, this sync block contains 90 bytes, including two synchronizing (sync) bytes and three identification (ID) bytes (ID0, ID1 and IDP) which comprise a five byte sync area. The succeeding five bytes form the audio auxiliary (AAUX) area of the audio sync block. Each AAUX area contains system data which assists in automatic recording and playback operations in addition to providing information to a user and is further described below. System data in each AAUX area is recorded in the five byte pack structure (discussed below), resulting in a total of nine AAUX packs of system data in the audio area of a track (see FIG. 6A). Following the AAUX area are 72 bytes of audio data followed by 8 bytes of C1 code for error correction.

Figure 7:
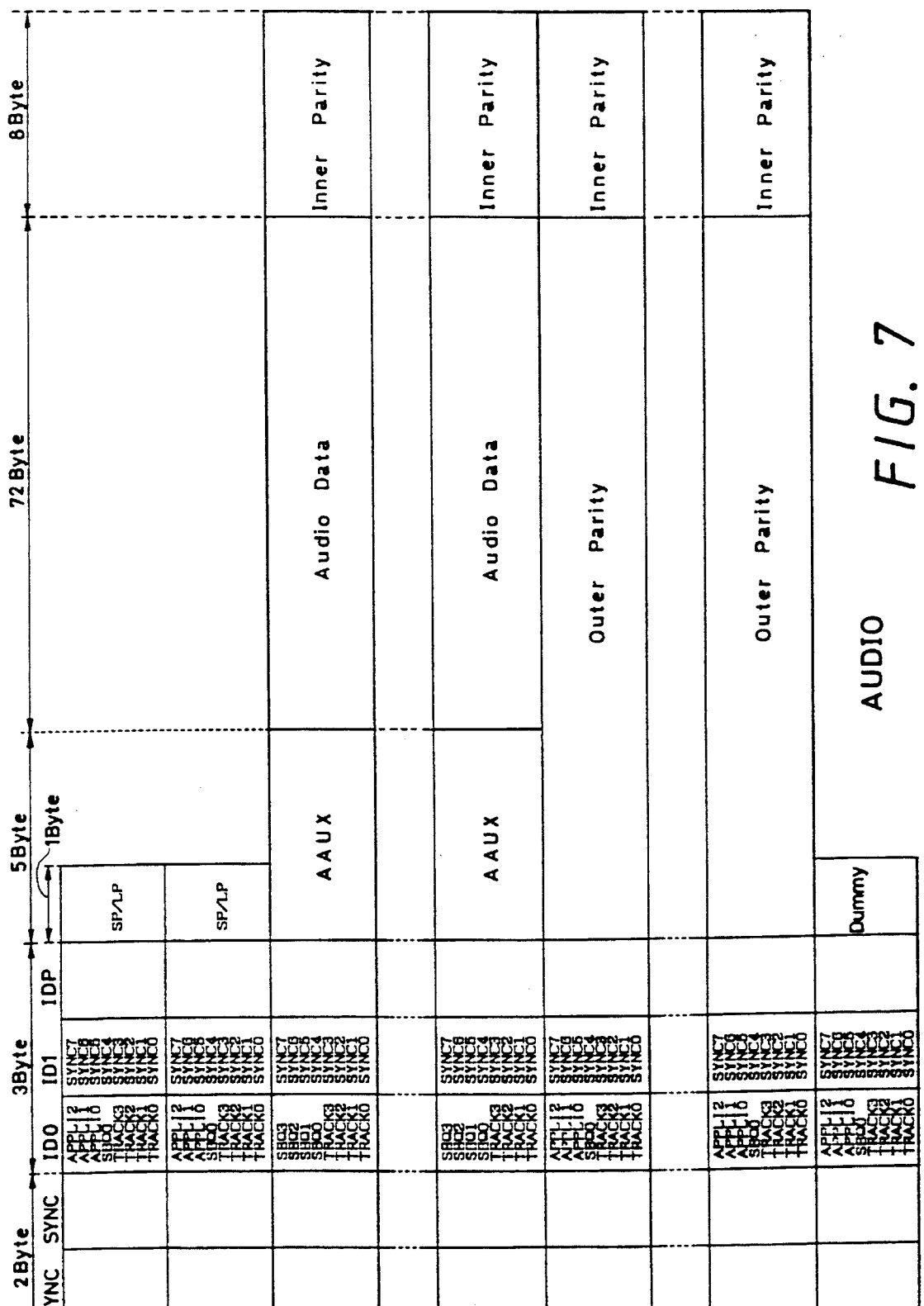
FIG. 7 illustrates in greater detail the data structure of the entire audio area of a record track in accordance with this invention.

FIG. 7 schematically illustrates the data structure of the entire audio area of a track. The audio area contains 17 sync blocks designated as Sync Block Nos. 0–16. Two pre-synchronizing blocks (Sync Block No. 0 and Sync Block No. 1) precede the audio sync blocks and one post-synchronizing block (Sync Block No. 18) follows the parity sync blocks (Sync Block Nos. 11–15). Each of the 17 sync blocks contain two sync bytes and three identification bytes, comprising the five byte sync area. Identification bytes ID0 and ID1 provide identification information and are described below. Identification byte IDP is a parity byte.

The two pre-sync blocks (Sync Block Nos. 0–1) are each six bytes long. Each contains the five byte sync area mentioned above and an additional byte which designates the recording/reproducing mode of the recorded video and audio coded signal. There are nine audio sync blocks (Sync Block Nos. 2–10) and five parity sync blocks (Sync Block Nos. 11–15) as described above. The post-sync block (Sync Block No. 16) is six bytes long and has a dummy byte following the five byte sync area.

Identification bytes ID0 and ID1 store application ID signal AP1, the track number of the track within a frame in which the audio area is recorded, the sync block number and a sequence number (discussed below). Application ID signal AP1, as described above, defines the data structure of the audio area (Area 1) of a track. Bits APPLI2, APPLI1 and APPLI0 comprise signal AP1 and are stored as the three most significant bits of byte ID0 in Sync block Nos. 0, 1 and 11–16.

The track number is identified by bits TRACK3, TRACK2, TRACK 1 and TRACK0 which are stored as the four least significant bits of byte ID0 in each sync blocks in the audio area. The track number identifies the track number within a single frame. For example, in the NTSC system, there are ten tracks per frame wherein the track number indicates which of the ten tracks of that frame is being recorded/reproduced.

Bits Sync7-0 identify the sync block number and are stored in byte ID1 in each sync block. As discussed above, the sync block number identifies the sync block within the audio area of a track, that is, whether the sync block is a pre-sync block, parity sync block, audio sync block or post-sync block. It is appreciated that in the audio area of a track, the sync blocks are numbered 0 through 16.

A sequence number is identified by bits SEQ3, SEQ2, SEQ1 and SEQ0 which are stored as the four most significant bits of sync blocks nos. 2–10. The sequence number is used for high speed playback and indicates a sequence frame number. That is, the sequence number value changes at each new frame, cycling through values 0 through 15.

Figure 8:
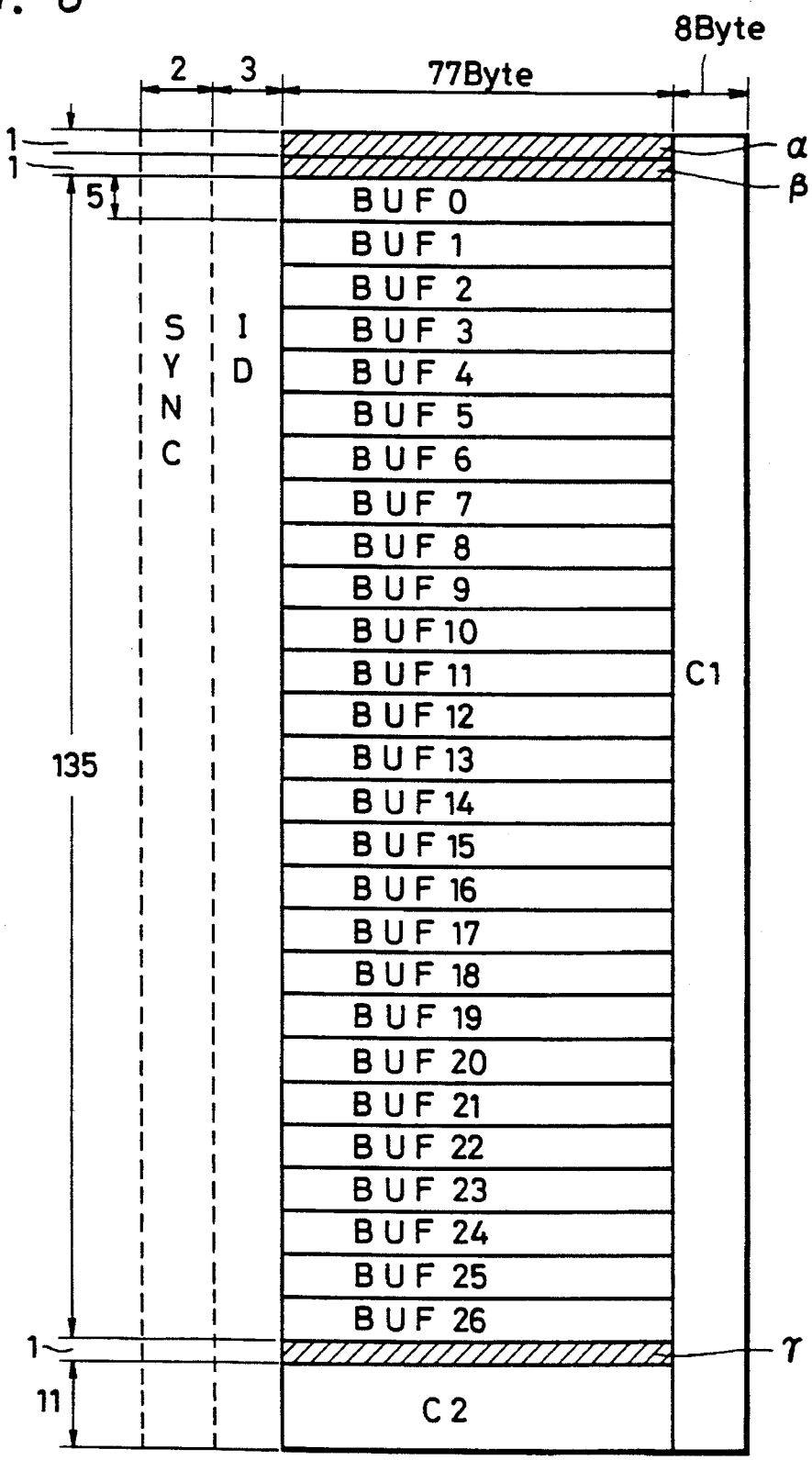
FIG. 8 schematically illustrates the data structure of the video area of a record track in accordance with this invention.

The data structure of the video area of a track is illustrated in FIG. 8. The video area contains two video auxiliary (VAUX) sync blocks (α and β), 27 buffer blocks (BUF 0-BUF 26), a third VAUX sync block (γ) and 11 parity sync blocks of C2 code (outer parity). Each buffer block contains five video sync blocks for a total of 135 video sync blocks. Each of the above-described sync blocks is 90 bytes long. The first five bytes of each sync block comprises a five byte sync area (two bytes Sync and three bytes ID) similar to that described in conjunction with the audio area, which is followed by 77 bytes of video data and 8 bytes of C1 code (inner parity).

The data structure of the video area is described in greater detail with reference to FIG. 9. As shown in FIG. 9, there are two pre-sync blocks (Sync Block Nos. 17 and 18) at the beginning of the video area. Two VAUX sync blocks (Sync Block Nos. 19 and 20), 135 video sync blocks (Sync Block Nos. 21–155), a third VAUX sync block (Sync Block No. 156) and 11 parity sync blocks (Sync Block Nos. 157–167) follow the two pre-sync blocks in this order. A post-sync-block (Sync Block No. 168) is located at the end of the video area of a track. The pre-sync blocks, VAUX sync blocks, video sync blocks and parity sync blocks are further discussed below.

The two pre-sync blocks and the post-sync block are each six bytes long, the first five bytes comprising the five byte sync area. The remaining byte in each pre-sync block designates the recording mode (SP/LP). The remaining byte of the post-sync block is a dummy byte.

The first five bytes in each sync block in the video area of a track comprise the five byte sync area formed of two sync bytes and three bytes (ID0, ID1 and IDP) of identification data. Identification bytes ID0 and ID1 store application ID signal AP2, the track number, the sync block number and the sequence number, all being similar to that described above in conjunction with the audio area. Byte IDP is a parity byte.

Application ID signal AP2, as discussed above, defines the data structure of the video area (Area 2) of a track. Bits APPLI2, APPLI1 and APPLI0 comprise signal AP2 and are stored as the three most significant bits of byte ID0 in sync blocks Nos. 17, 18 and 157–168.

The track number is identified by bits TRACK3, TRACK2, TRACK 1 and TRACK0 which are stored as the four least significant bits of byte ID0 in each sync block in the video area. As explained above, the track number identifies the track number of this particular track within a single frame. For example, in the NTSC system, there are ten tracks per frame wherein the track number indicates which of the ten tracks of the frame is being recorded or reproduced.

Bits Sync7-0 identify the sync block number and are stored in byte ID1 in each sync block. As discussed above, the sync block number identifies the sync block within the video area of a track, that is, whether the sync block is a pre-sync block, VAUX sync block, parity sync block, video sync block or post-sync block. In the video area of a track, the sync blocks are numbered 17 through 168.

The sequence number is identified by bits SEQ3, SEQ2, SEQ1 and SEQ0 which are stored as the four most significant bits of byte ID0 in sync blocks nos. 19–156. As described above, the sequence number is used for high speed playback and indicates a sequence frame number. The sequence number value changes at each new frame, cycling through values 0 through 15.

VAUX sync blocks (Sync Block Nos. 19, 20 and 156) contain system data in the 77 bytes that follow the five byte sync area of each VAUX sync block. The VAUX sync blocks are further described with reference to FIG. 10. As shown, the 77 bytes following the five byte sync area comprise a VAUX area in each VAUX sync block. Each VAUX area is divided into 15 groups of five bytes each with the remaining two bytes of each VAUX area being reserved for future use. Each five byte group in the VAUX areas contains system data in the five byte pack structure (discussed below). Thus, the three VAUX sync blocks in the video area of a track contain a total of 45 packs of system data. The remaining eight bytes of each VAUX sync block is comprised of C1 code (inner parity) for error correction.

Video sync blocks (Sync Block Nos. 21–155) contain 77 bytes of video data following the five byte sync area. Eight bytes of C1 code (inner parity) follow the video data. Parity sync blocks (Sync Block Nos. 157–167) contain 77 bytes of C2 code (outer parity) and eight bytes of C1 code (inner parity).

The data structure of the subcode area of a track is illustrated in FIG. 11. The subcode area contains 12 sync blocks identified as Sync Block Nos. 0–11. Each subcode sync block contains a five byte sync area, a five byte data area and two bytes of C1 code (parity).

The five byte sync area is formed of two sync bytes and three identification bytes (ID0, ID1 and IDP). Identification bytes ID0 and ID1 store frame ID signal FR, application ID signals AP3 and APT, absolute track number Tr, blank flag BF and the subcode sync block number.

Frame ID signal FR is one bit long and identifies the field of the frame. That is, whether the recorded track contains information for the first half of the video frame (odd field) or the second half of the video frame (even field). For the NTSC system, FR=0 in the first five tracks and FR=1 in the second five tracks, comprising one video frame. Bit FR is stored at the most significant bit of byte ID0 in each subcode sync block.

As illustrated in FIG. 12, application ID signal AP3, as described above, defines the data structure of the subcode area (Area 3) of a track. Signal AP3 is identified by bits AP3-2, AP3-1 and AP3-0 which comprise the second through fourth most significant bits of byte ID0 in subcode sync block nos. 0 and 6.

Application ID signal APT, as described above, defines the data structure of a track. Bits APT2, APT1 and APT0 identify signal APT and comprise the second through fourth most significant bits of byte ID0 in subcode sync block number 11. Signal APT in the subcode area has the same value as signal APT in the ITI area as described above.

Absolute track number Tr identifies the track on the tape. Every track has a different absolute track number which is used by the digital video tape recorder to determine the absolute position of the tape. The absolute track number is 23 bits long and is stored in bytes ID0 and ID1 as bits Tr. No.0 through Tr. No.22 in successive subcode sync block nos. 0–2. As shown in FIG. 12, the absolute track number extends through three sync blocks where the most significant bit (MSB) is at the fifth most significant bit of byte ID0 in sync block number 2 and the least significant bit (LSB) is at the third most significant bit of byte ID1 in sync block number 0. The absolute track number is repeated three more times in subcode sync block numbers 4–11. Blank flag BF is one bit long and identifies whether the absolute track number is continuous or discontinuous. That is, BF=1 when there is continuous recording on the tape, i.e. the absolute track number is not approximated. BF=0 when recording is discontinuous, i.e. a preceding portion of the tape is blank. When BF=0, the stored absolute track number is estimated. Bit BF is repeated four times as the fourth most significant bit of byte ID1 in subcode sync block nos. 0, 3, 6 and 9.

Referring back to FIG. 11, the subcode sync block number is identified by bits SYNC 3, SYNC 2, SYNC 1 and SYNC 0 which are defined as the four least significant bits of byte ID1 of each subcode sync block. As discussed above, the subcode sync block number identifies the sync block within the subcode area of a track.

The five byte data area following the five byte sync area in each subcode sync block contains system data stored in the five byte pack structure (discussed below). Thus, the subcode area of a track contains 12 packs of system data.

The remaining two bytes of each subcode sync block contain C1 (inner parity) code for error correction. In the preferred embodiment, the subcode area of a track does not contain C2 (outer parity) code.

For the above-described format, application ID signals APT, AP1, AP2 and AP3, track number data, which includes data identifying a particular track within a single frame and data identifying the absolute position of the track on the tape, sequence number data and the blank flag, among other data signals, are stored several times in bytes ID0 and ID1 so as to minimize detection errors and permit the use of majority logic or the like.

In addition, in the recording and reproducing apparatus used with the present invention, since different types of data compression can be carried out, each compression unit requires therein application ID data so that the appropriate decompression technique can be used to reproduce that data. Therefore, to assure reliability, such application data should appear several times in the code.

Further, during variable speed playback, there is a risk that the head will reproduce areas that do not contain application data. To minimize this risk, application data is included in every compression unit.

Figure 13:
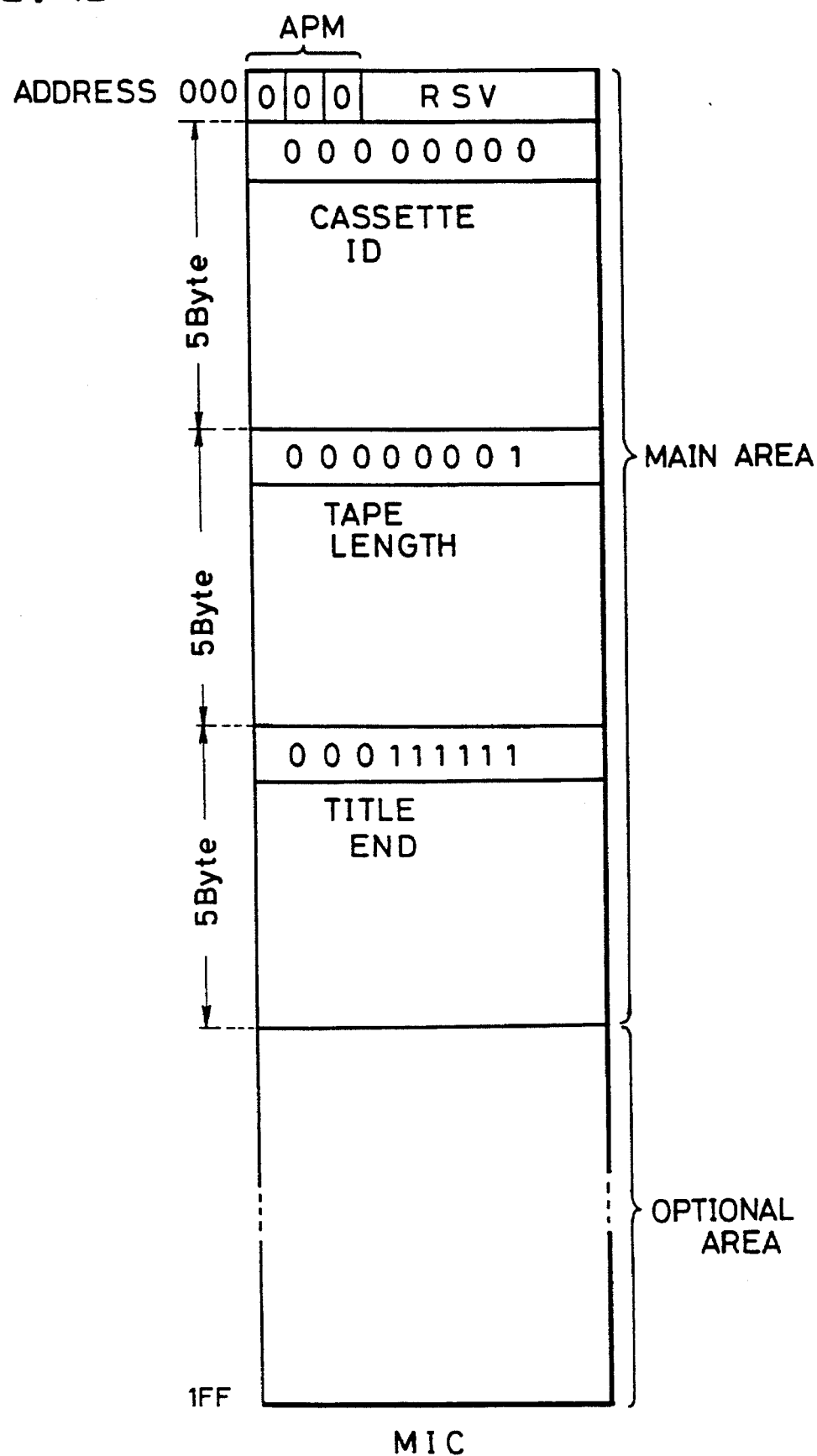
FIG. 13 illustrates the data structure of the data which identifies the information recorded on the record tape housed within a cassette, which information may be stored in a memory chip provided on or in the cassette itself.

The assignee of the present application has previously proposed an apparatus in which a circuit board having a memory is mounted in a cassette housing a magnetic tape (see Japanese Patent Application Nos. 4-165444 and 4-287875). In accordance with the present invention, a tape cassette having a random access memory located in or on the cassette housing is used with the digital video tape recorder of the present invention. Data stored in this random access memory is read by the video tape recorder to assist in the recording and reproducing of digital video and audio data. This memory has a data structure as illustrated in FIG. 13. As shown, application ID signal APM is stored in the memory in the cassette (MIC) which, for example, has a 512 byte total storage capacity. Application ID signal APM is three bits long and defines the data structure of the MIC. This data structure may be different for different applications. For example, APM=000 identifies the cassette as a cassette for use with a consumer digital video tape recorder. For other applications, such as when the information recorded in the cassette is computer data, the value of APM is different. Application ID signal APM is stored as the three most significant bits of address 0 of the MIC. The remaining addresses in the MIC are divided into groups of five bytes each, each group containing system data stored in the aforementioned five byte pack structure (further discussed below).

For the above-described recording format, 66 packs containing system data are stored on each track. As previously discussed, the audio area of a track contains 9 packs of system data, the video area of a track contains 45 packs of system data and the subcode area of a track contains 12 packs of system data. Thus, one frame, comprising 10 tracks in the NTSC system, contains 660 packs of system data.

As described above, system data assists in the automatic recording and playback operations of the video digital tape recorder of the present invention. Examples of various system data include total length of time of a recorded program (e.g. television program), remaining length of time of a recorded program, cassette identification data, existence of closed caption data, channel number of a program to be recorded, recording start time, recording end time, recording date etc. One example of an automatic recording operation with which various system data is utilized is when a user "pre-sets" the video tape recorder of the present invention to record a television program on a specified channel at a specified future date and time which is to be recorded at a blank location of the magnetic tape. The digital video tape recorder stores this information as system data on the magnetic tape or in the memory in the cassette which allows the user to remove the cassette from the recorder prior to recording and then later re-load the cassette into the same or different recorder which then reproduces the stored system data, automatically recording the desired program at the appropriate date and time at a blank location of the magnetic tape. It can be appreciated that without utilizing the above described system data, a digital video tape recorder could not be capable of the above described operation. It should also be noted that the above example merely illustrates one of many possible uses of the above described system data.

Further, some system data additionally provides useful information to a user upon reproduction of that data from the magnetic tape. For example, it may be desired for a user to display titles of programs stored on a magnetic tape, such titles originally being supplied by a user during recording of these programs. In addition, the above-described system data which assists in various automatic operations of the digital video tape recorder of the present invention may also be displayed to a user.

The data structure of the five byte pack will now be described with reference to FIGS. 14–16. Each pack in the AAUX, VAUX and subcode data areas of a track is formed of five bytes as illustrated in FIG. 14. The first byte (PC0) of a pack designates the "Item", also called the "Header" of the pack, which identifies the type of system data represented by the following four bytes (PC1–4). The Item (PC0) is divided into the upper 4 bits, referred to as the "Large Item", and the lower 4 bits, referred to as the "Small Item". The large item identifies the group in which the system data pertains and the small item identifies specifically what information is contained within the following four bytes within the specified group.

FIG. 15 is a table showing the available groups of system data. As shown, the large item can specify the groups of Control (0000), Title (0001), Chapter (0010), Part (0011), Program (0100), Audio Auxiliary Data (AAUX) (0101), Video Auxiliary Data (VAUX) (0110), Camera (0111), Line (1000) and Soft Mode (1111). In addition large items (1001) to (1110) are reserved for future use.

FIG. 16 is a table showing all of the pack headers of the groups shown in FIG. 15. The groups are shown as vertical columns wherein large item 0000 signifies the Control group, large item 0001 signifies the Title group, etc. As shown, the Control group (large item 0000) includes the small items of Cassette ID (0000), Tape Length (0001), Timer Rec Date (0010), Timer Rec S/S (0011) etc, having a total of 16 small items. The other groups similarly have 16 small items each.

As shown, the Title group (large item 0001), Chapter group (large item 0010), Part group (large item 0011) and Program group (large item 0100) each have similar corresponding small items, and relate to the identification of a program (e.g. television program, movie, instructional lesson etc) which is recorded on the magnetic tape in the cassette in which the system data is stored. System data in these groups store identification information which includes the total time of the recorded program, the remaining time of the program and text information describing the program. In one embodiment of the present invention, the groups of Title and Program are utilized when a television program, for example, is recorded by a user of the digital video tape recorder, and the groups of Title, Chapter and Part are utilized by what has become known in the art as soft tapes (e.g. professionally recorded tapes).

Small items in other groups represent other types of information stored as system data. For example, the group Line (large item 1000) pertains to data resulting from sampling video data within the vertical blanking period and the group Camera (large item 0111) pertains to the operation of a video camera.

As described above, the audio, video and subcode areas of a track store system data in the five byte pack structure. In addition, the memory in the cassette contains system data in the five byte pack structure. In the preferred embodiment of the present invention, the respective AAUX, VAUX, subcode data and MIC areas comprises a "main area" and an "optional area" and are described below.

As described above, the AAUX area of the audio area of a track contains nine packs of system data as shown in FIG. 6A. Referring to FIG. 17, there are nine packs, numbered 0 through 8, in each of the ten tracks of a frame where pack No. 0 corresponds to the pack in the first audio sync block of a track and pack No. 8 corresponds to the pack in the ninth audio sync block of a track. As shown, pack Nos. 3–8 in odd numbered tracks (tracks No. 1, 3, 5, 7 and 9) contain the numbers 50, 51, . . . 55, respectively, and pack nos. 0–5 in even numbered tracks (tracks No. 2, 4, 6, 8 and 10) also contain the numbers 50, 51 . . . 55, respectively. This area, i.e. those packs which contain a number, comprises the AAUX Main Area, while the other area, i.e. those packs that do not contain a number, comprises the AAUX Optional Area. The defined AAUX Main Area contains "basic" system data and the AAUX Optional Area contains other or "optional" system data but may also contain "no information" data (discussed below). One purpose for having the above described pack structure in the AAUX area is to prevent data from a single channel (e.g. tracks reads by one head) from being lost due to a head failure. In addition, the above described pack structure copes with what has become known in the art as lateral scratch.

The AAUX Main Area shown in FIG. 17 contains "basic" system data corresponding to the AAUX group (large item 0101) shown in FIG. 16. The small item Source in the AAUX group corresponds to item no. 01010000, which is large item 0101, which equals 5 (decimal) and small item 0000, which equals 0 (decimal), thus corresponding to the number "50". Similarly, the small item Source Control in the AAUX group has item no. 01010001, corresponding to "51". Referring back to FIG. 17, the packs in the AAUX Main Area contain the numbers 50 to 55, which corresponds to the small items Source, Source Control, Rec Data, Rec Time, Binary Group and TBD in the AAUX group shown in FIG. 16. Thus, the "basic" system data contained within these small items in the AAUX group are stored in the AAUX Main Area of the audio area of a track. In addition, "optional" system data refers to any item which is selectably stored in the AAUX Optional Area of the audio area of the track.

FIGS. 18A to 18F illustrate the data structure of the pack headers of the "basic" system data stored in the AAUX Main Area of the audio area of a track. The small item Source in the AAUX group (item 01010000) is stored in pack no. 3 in odd numbered tracks and in pack no. 0 in even numbered tracks as shown in FIG. 17. FIG. 18A illustrates the data structure of this system data, where the first byte PC0 equals 01010000 to indicate small item Source in the AAUX group. Bytes PC1 to PC4 contain the information of locked mode flag (LF), audio frame size (AF Size), audio channel mode (CH), field system (50/60), signal type (STYPE), emphasis flag (EF), time constant of emphasis (TC), sampling frequency (SMP) and quantization (QU) of the recorded audio signal.

FIG. 18B illustrates the data structure of small item Source Control in the AAUX group (item 01010001) which is stored in pack no. 4 in odd numbered tracks and in pack no. 1 in even numbered tracks. As shown, byte PC0 equals 01010001 where bytes PC1 to PC4 contain the recording start frame (REC ST), the recording end frame (REC END), direction flag (DRF), playback speed of input audio signal (SPEED) and the genre category.

FIG. 18C shows the data structure of small item Rec Date in the AAUX group (item 01010010) which is stored in pack no. 5 in odd numbered tracks and in pack no. 2 in even numbered tracks. As shown, byte PC0 equals 01010010 and bytes PC1 to PC4 store daylight saving time data (DS), a thirty minutes flag (TM), the time zone, day, week, month and year.

FIG. 18D shows the data structure of small item Rec Time in the AAUX group (item 01010011) which is stored in pack no. 6 in odd numbered tracks and in pack no. 3 in even numbered tracks. As shown, byte PC0 equals 01010011 and bytes PC1 to PC4 store information relating to the time of recording. In the preferred embodiment, the time recorded is based on SMPTE/EBU, a semi-professional time code format.

FIG. 18E shows the data structure of small item Binary Group in the AAUX group (item 01010100) which is stored in pack no. 7 in odd numbered tracks and in pack no. 4 in even numbered tracks. As shown, byte PC0 equals 01010100 and bytes PC1 to PC4 contain eight binary groups.

FIG. 18F shows the data structure of small item TBD in the AAUX group (item 01010101) which is stored in pack no. 8 in odd numbered tracks and in pack no. 5 in even numbered tracks. As shown, byte PC0 equals 01010101 and bytes PC1 to PC4 are yet to be defined.

Figure 10:
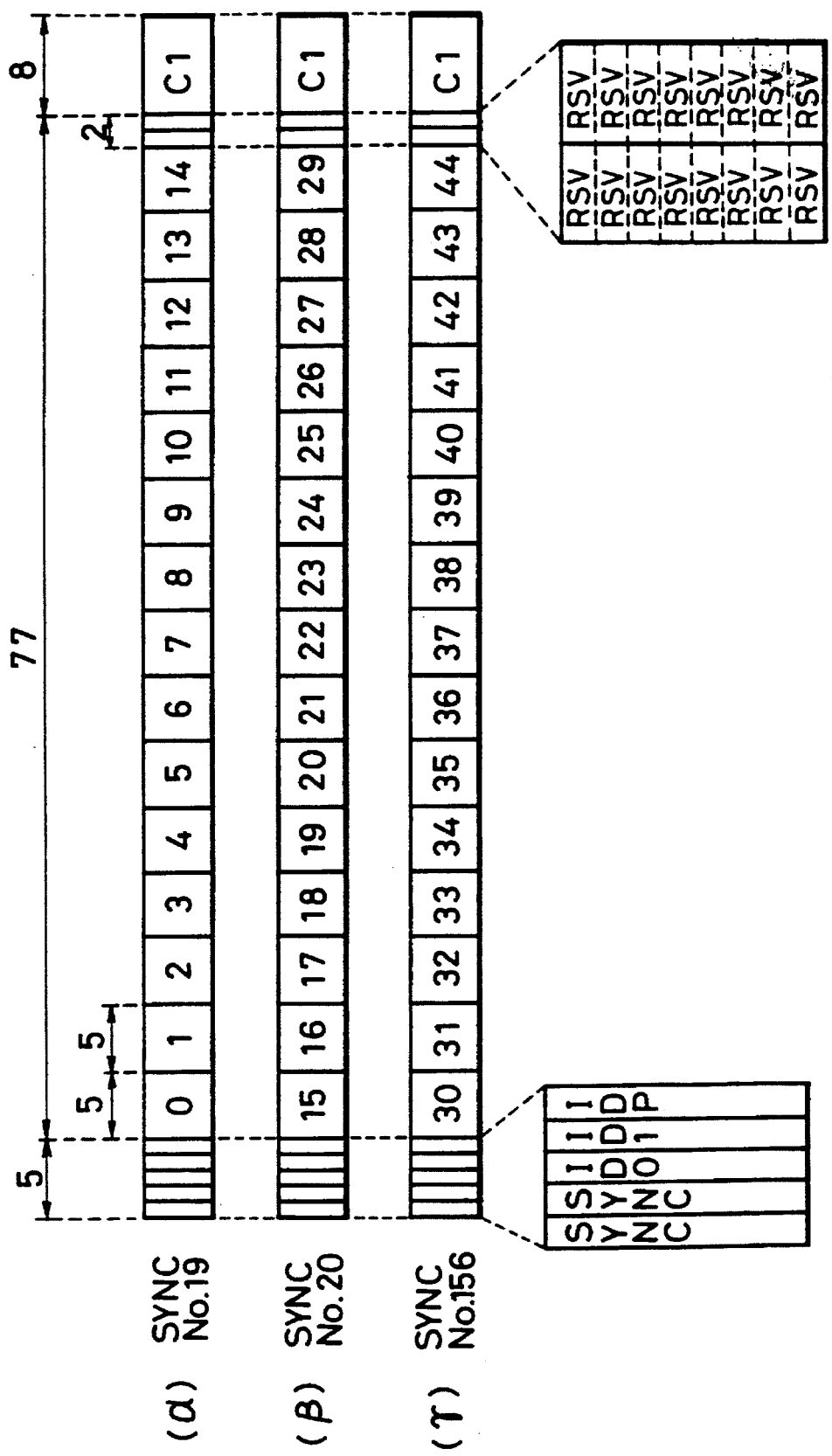
FIG. 10 illustrates the data structure of the video auxiliary (VAUX) sync blocks of the video area shown in FIG. 9.

As described above, the VAUX area of the video area of a track contains 45 packs. As shown in FIG. 10, the packs in the VAUX area of the video area of a track are numbered 0 to 44. Referring now to FIG. 19, the pack structure of the VAUX area of the video area of ten tracks (one frame) is shown. Pack nos. 39–45 in odd numbered tracks and pack nos. 0–5 in even numbered tracks comprise the VAUX Main Area. The other packs, i.e. those that do not contain a number, comprise the VAUX Optional Area. The VAUX Main Area contains the "basic" system data and the VAUX Optional Area contains other system data but may also contain "no information" data (discussed below).

The VAUX Main Area stores "basic" system data which corresponds to the VAUX group (large item 0110) as shown in FIG. 16. Small item Source in the VAUX group has an item no. of 01100000, whose upper portion 0110 equals 6 (decimal) and lower portion (0000) equals 0 (decimal), which corresponds to the number "60". Referring back to FIG. 19, the packs in the VAUX Main Area contain numbers 60 to 65, which corresponds to the small items Source, Source Control, Rec Data, Rec Time, Binary Group and Closed Caption in the VAUX group shown in FIG. 16 and thus, the "basic" system data contained within these small items in the VAUX group are stored in the VAUX Main Area of the video area of a track (FIG. 19). In addition, "optional" system data refers to any item which is selectably stored in the VAUX Optional Area of the video area of the track.

FIGS. 20A to 20F illustrate the data structure of the "basic" system data stored in the VAUX Main Area. FIG. 20A shows the data structure of small item Source in the VAUX group (item 01100000) which is stored in pack no. 39 in odd numbered tracks and in pack no. 0 in even numbered tracks. As shown, byte PC0 equals 01100000 and bytes PC1 to PC4 store data pertaining to the number of television channels (TENS of TV CHANNEL and UNITS of TV CHANNEL), color frames enable flag (EN), color frames identification code (CLF), the input source (SOURCE CODE), the field system (50/60), the signal type (STYPE) and the Tuner Category of the video signal.

FIG. 20B shows the data structure of small item Source Control in the VAUX group (item 01100001) which is stored in pack no. 40 in odd numbered tracks and in pack no. 1 in even numbered tracks. As shown, byte PC0 equals 01100001 and bytes PC1 to PC4 contain the display select mode (DISP), a frame/field flag (FF), the type of broadcast system (BCSYS) and the Genre Category.

FIG. 20C shows the data structure of small item Rec Date in the VAUX group (item 01100010) which is stored in pack no. 42 in odd numbered tracks and in pack no. 2 in even numbered tracks. As shown, byte PC0 equals 01100010 and bytes PC1 to PC4 store information concerning daylight saving time (DS), a thirty minutes flag (TM), time zone, day, week, month and year.

FIG. 20D shows the data structure of small item Rec Time in the VAUX group (item 01100011) which is stored in pack no. 42 in odd numbered tracks and in pack no. 3 in even numbered tracks. As shown, byte PC0 equals 01100011 and bytes PC1 to PC4 store information relating to the time of recording. As discussed above, the time recorded is based on SMPTE/EBU, a semi-professional time code format.

FIG. 20E shows the data structure of small item Binary Group in the VAUX group (item 01100100) which is stored in pack no. 43 in odd numbered tracks and in pack no. 4 in even numbered tracks. As shown, byte PC0 equals 01100100 and bytes PC1 to PC4 contain 8 binary groups.

FIG. 20F shows the data structure of small item Closed Caption in the VAUX group (item 01100101) which is stored in pack no. 44 in odd numbered tracks and in pack no. 5 in even numbered tracks. As shown, byte PC0 equals 01100101 and bytes PC1 to PC4 contain closed caption data.

As discussed above, the Subcode data area of a track contains 12 packs. Referring back to FIG. 11, the packs in sync block nos. 3–5 and 9–11 comprise the Subcode Main Area and the packs in sync block nos. 0–2 and 6–8 comprise the Subcode Optional Area. The Subcode Main Area contains the "basic" system data (discussed below) and the Subcode Optional Area contains other system data but may also contain "no information" data (discussed below).

As shown in FIG. 16, the Subcode Main Area comprises the "basic" system data corresponding to small items Time Code and Binary Group in the Title group, small item Part No. in the Part group and small item Chapter Start in the Chapter group.

FIGS. 21A to 21D illustrate the data structure of the system data stored in the Subcode Main Area of the subcode area of a track. Small item Time Code in the Title group (item 00010011), illustrated in FIG. 21A, stores the elapsed time of a stored program where byte PC0 equals 00010011. FIG. 21B shows the data structure of small item Binary Group in the Title group (item 00010100). As shown, byte PC0 equals 00010100 and bytes PC1 to PC4 contain eight binary groups. FIG. 21C shows the data structure of small item Part No. in the Part group (item 00110010) where byte PC0 equals 00110010 and bytes PC1 and PC2 contain the chapter no. and the part number of the recorded program. FIG. 21D shows the data structure of small item Chapter Start in the Chapter group (item 00101011) where byte PC0 equals 01100001 and bytes PC1 to PC4 contain the absolute track number of the start position of the chapter (TRACK NO.), a temporary true flag (TT) and text flag (TEXT) for use with the MIC only and the genre category.

In addition, any item (FIG. 16) including the above discussed items may be selectively stored in the Subcode Optional Area of the subcode area of a track.

The MIC data area located in the memory in the cassette contains an MIC Main Area and an MIC Optional Area as shown in FIG. 13. The first three packs in the memory comprise the MIC Main Area and the remaining packs comprise the MIC Optional Area. The MIC Main Area contains the "basic" system data and the MIC Optional Area contains other system data but may contain "no information" data (discussed below).

The MIC Main Area stores the "basic" system data corresponding to small items Cassette ID and Tape Length in the Control group and small item Title End in the Title group. FIGS. 22A to 22C illustrate the data structure of these packs.

Small item Cassette ID in the Control group (item 00000000) is illustrated in FIG. 22A which shows byte PC0 equaling 00000000 and Byte PC1 to PC4 containing such information as MIC Error (ME) to designate whether all events in the MIC exist, the maximum number of words to be able to be written in a single multi-byte write cycle (MULTI-BYTES), the memory type (MEM TYPE), the memory size (MEM SIZE), the total number of memory banks (MEM BANK NO.) and the tape thickness (THICK1, THICK 1/10).

FIG. 22B shows the data structure of small item Tape Length in the Control group (item 00000001) where byte PC0 equals 00000001 and bytes PC1 to PC3 contain the last absolute track number of the tape.

FIG. 22C shows the data structure of small item Title End in the Title group (item 00011111) where byte PC0 equals 00011111 and bytes PC1 to PC4 contain the absolute track number of the end of the program on the tape (TRACK NO.), a blank flag (BF) to designate whether continuity exists for the track number, the recording mode (SL) and a recording protection flag (RE).

Figure 23A:
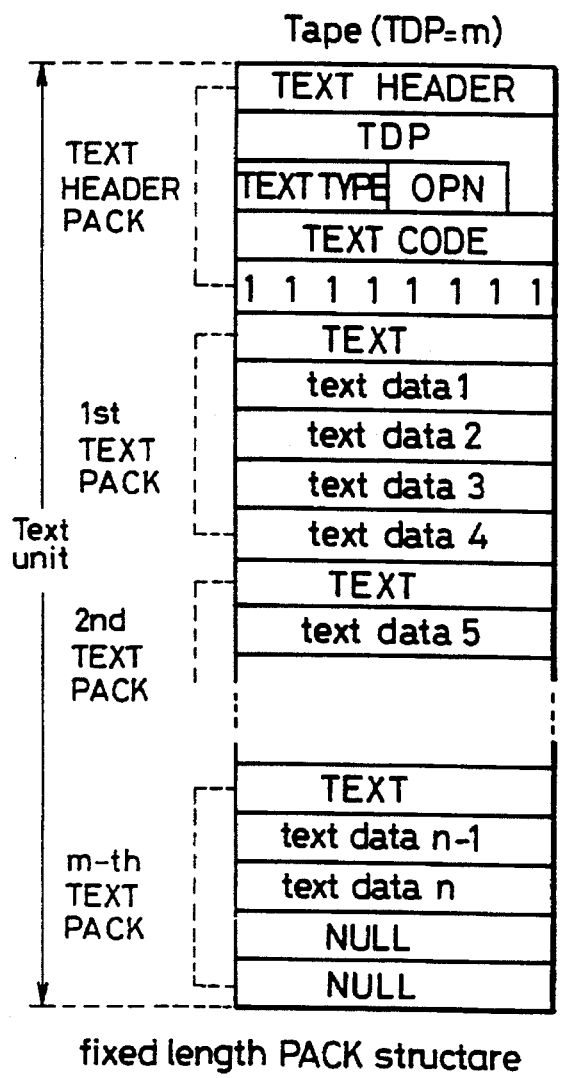
FIGS. 23A and 23B illustrate the data structure of Text Header packs stored on tape and Text Header packs stored in memory of the cassette.
Figure 23B:
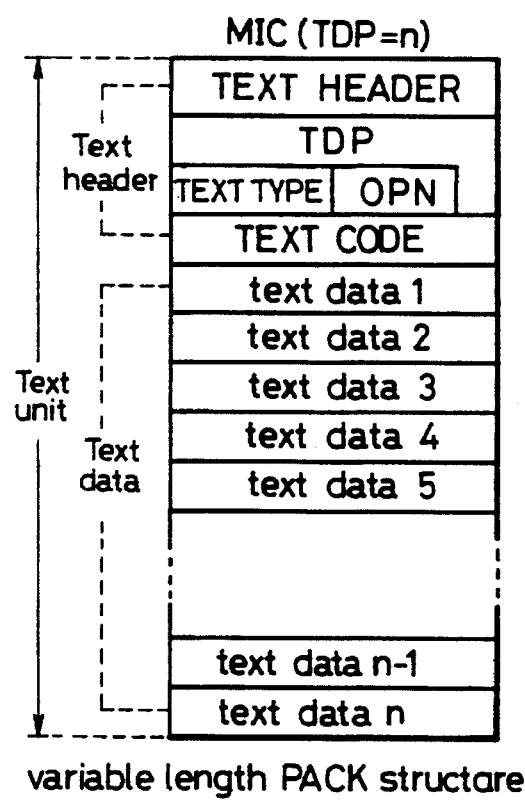

Referring back to FIG. 16, it is seen that small item Text Header (lower portion 1000) and small item Text (lower portion 1001) both appear in the same nine groups (Control through Line). These Text Header and Text packs store user supplied text information whose data structure is shown in FIG. 23A. In the preferred embodiment of the present invention, the data structure shown in FIG. 23A is utilized only for system data stored on the magnetic tape (i.e. in the AAUX area, VAUX or subcode data area of a track) and not for system data containing text data stored in the MIC. FIG. 23B illustrates the data structure of a pack containing text information stored in the MIC.

As shown in FIG. 23A, byte TDP (PC1) of the text header pack designates the total number of text data (n) contained within the following text packs and bytes PC2 and PC3 identify the type of text which is stored. The following text packs each contain a "text" item (PC0) and four bytes of text data(PC1–4).

FIG. 23B illustrates the data structure of the text header pack used for storing text data in the MIC. As shown, this pack has a variable length wherein TDP (PC1) indicates the total number of text data (n) contained within and thus, the total length of this pack varies based upon the value of TDP. Text information such as the table of contents of the tape is merely one example of what information may be stored in this pack.

In another embodiment of the digital video tape recorder of the present invention, the audio and video signals are processed in a digital dubbing fashion under the condition that the audio and video signals are transmitted (i.e. recorded or reproduced) according to an incessant dubbing system. Also, since it is desired that a minimum amount of data be transmitted, the two sync bytes, byte IDP and the C1 and C2 areas are not recorded on or reproduced from the magnetic tape. In this instance, only data comprising bytes ID0, ID1 and the data portion (i.e. audio, video and system data) are recorded and reproduced.

In this embodiment, it is not desired to record (i.e. dub) erroneous data which was previously reproduced from a magnetic tape since these errors may propagate with successive dubbings. It is also not desired to record data indicative of the fact that recorded data is erroneous since such data may prevent the aforementioned minimum amount of data from being recorded. Therefore, it is desired to only transmit non-erroneous data.

Figure 24:
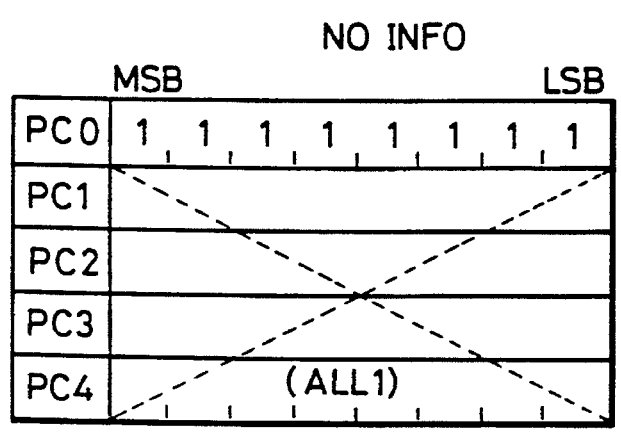
FIG. 24 illustrates the data structure of a "No Info" pack header.

To overcome the aforesaid problem, the system data corresponding to small item "No Info" in the Soft Mode group (FIG. 16) is utilized in the present invention which has the data structure shown in FIG. 24. When an error occurs during reproduction of data within a pack, the item (PC0) thereof is set to (11111111) prior to recording. Consequently, this item code indicates that the pack contains no information and therefore, upon re-recording of this data, no further problem can occur since reproduction of the "No Info" pack is understood to mean that there is no valid information contained within this pack. Thus, errors do not propagate upon dubbing and the harm to the video and audio signals is minimized.

Figure 25:
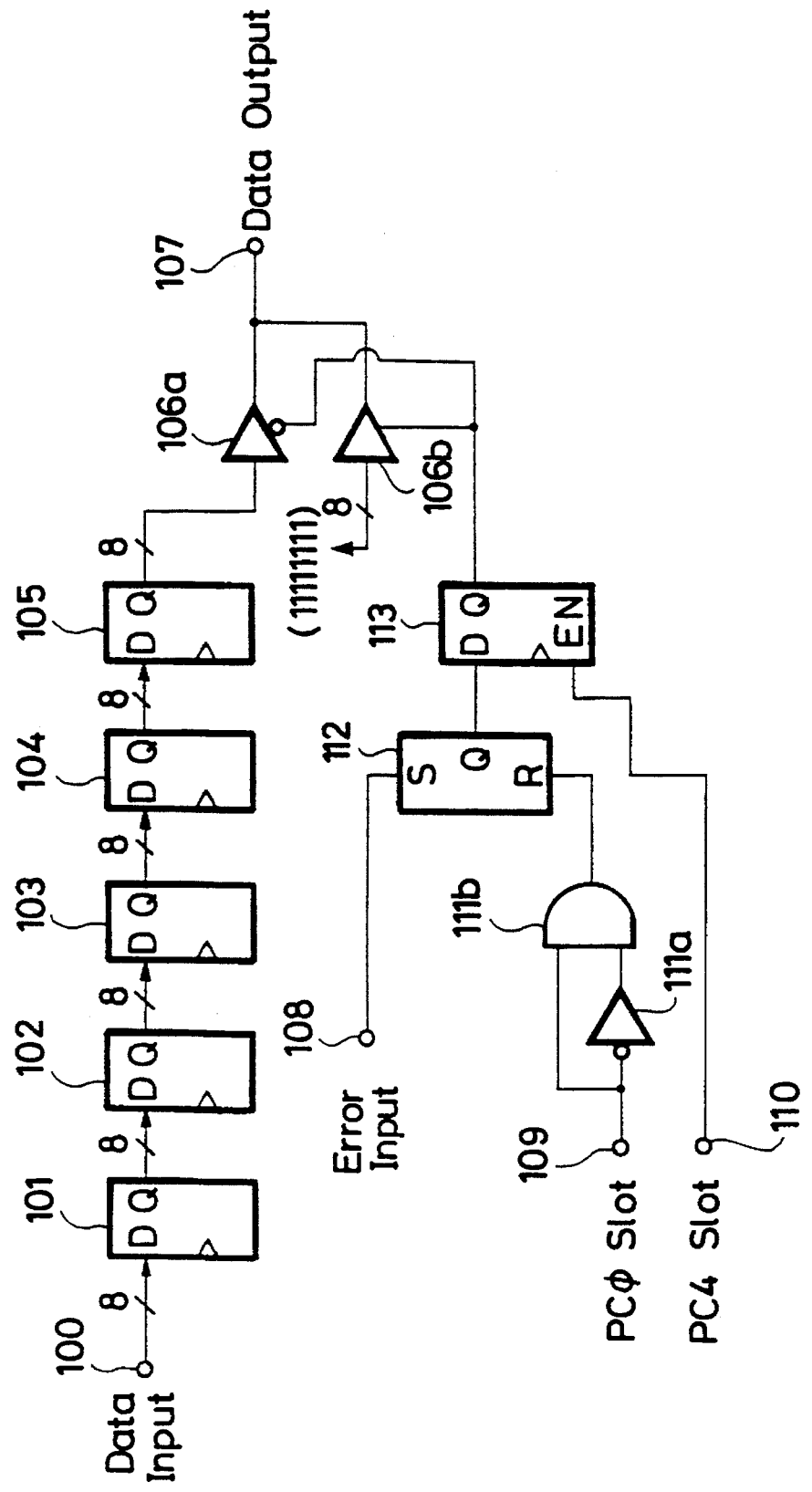
FIG. 25 is a circuit diagram for generating the "No Info" pack upon detecting an error during reproduction.

FIG. 25 shows an example of a circuit for realizing the above-described digital dubbing operation which comprises input terminal 100, five 8-bit D-type flip flops 101–105, switches 106a and 106b, data output terminal 107, error input terminal 108, PC0 input terminal 109, PC4 input terminal 110, invertor 111a, AND circuit 111b, RS-type flip-flop 112 and D-type flip-flop 113.

The first byte (PC0) (8 bits wide) of a reproduced pack is supplied to input terminal 100 and stored in D-type flip flop 101. PC0 is then stored in D-type flip flop 102 and at the same time, byte PC1 is supplied to input terminal 100 and stored in D-type flip flop 101. Bytes PC2, PC3 and PC4 are then successively supplied to data input terminal 100 and thus, after the five byte pack is reproduced, D-type flip flops 105–101 contains bytes PC0–4, respectively.

If an error is detected during reproduction of this pack, an error signal is supplied to error input 108, which sets RS-type flip flop 112. A PC0 slot signal is supplied to PC0 input terminal 109 at the occurrence of each new pack. RS-type flip flop 112 is then reset at the occurrence of each new pack by a differentiating circuit formed of invertor 111a and circuit 111b. The output of RS-type flip flop 112 is supplied to D-type flip flop 113.

D-type flip flop 113 supplies its output to switches 106a and 106b when enabled by a PC4 slot signal which is supplied to PC4 input terminal 110. D-type flip flop 113 is re-enabled for periods of five bytes. Accordingly, switch 106a is enabled when D-type flip flop 113 supplies a low output, thus causing the five byte pack stored in D-type flip flops 101–105 to be supplied to data output terminal 107. Conversely, switch 106b is enabled when D-type flip flop 113 supplies a high output, causing (11111111) to be supplied to data output terminal 107 for a period of five bytes. Therefore, when an error occurs during reproduction of a pack, a "No Info" pack is supplied, instead of erroneous data.

Further, a method in which the item (11111111) is applied to structures other than the pack structure will be described. When erroneous data appears in byte ID0 or ID1, that byte is replaced with the value (11111111). The reproducing device will recognize this to be an error since the value of these byte cannot equal (11111111).

Erroneous data in the video or audio signal portion of the reproduced track are replaced with their own error codes. For example, in a digital recording and reproducing apparatus in which the video signal is processed by a DCT compression system and the audio signal is processed in a 48 Khz and 16-bit sampling system, a DC component and an AC component of the video signal are replaced with (01111111) and (111101), respectively, and the audio signal is replaced with (1111111111111111).

In addition to the above described pack headers, there are additional headers that may be recorded in the AAUX optional area, VAUX optional area, Subcode optional area and MIC optional area. Referring back to FIG. 16, there are headers available that provide information about, for example, the start and end of the title, chapter, part, program, etc. In addition, the Soft Mode group (large item 1111) contains small items 0000 to 1110 which are left open for makers (i.e. manufacturers) to define.

A digital video tape recorder using the above described common pack structure can be realized by one microcomputer, which provides convenience and flexibility as described above. In addition, since the timing during the recording and reproducing modes is constant, an extra memory, such as a random access memory (RAM), need not be provided for timing purposes. Further, when new equipment is developed, the software can be easily developed.

With the above-described pack structure, errors do not propagate and large amounts of data are prevented from being destroyed. In addition, since the arrangements of corresponding small items in their respective groups, i.e. Title (0001), Chapter (0010), Part (0011) and Program (0100), have similar data structures, the packs of these small items can be easily processed.

Figure 26A:
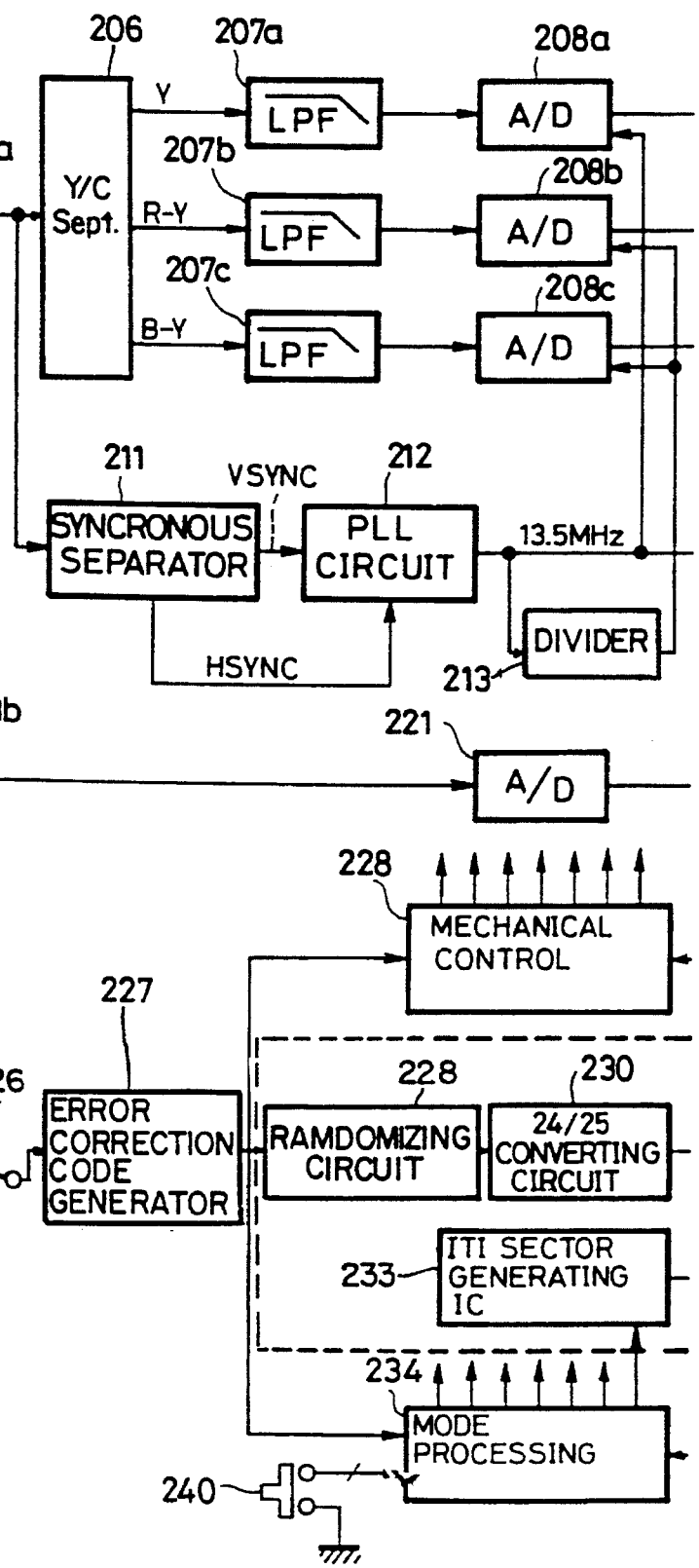
FIG. 26 is a block diagram of the recording portion of the digital video tape recorder in which the present invention finds ready application.
Figure 26B:
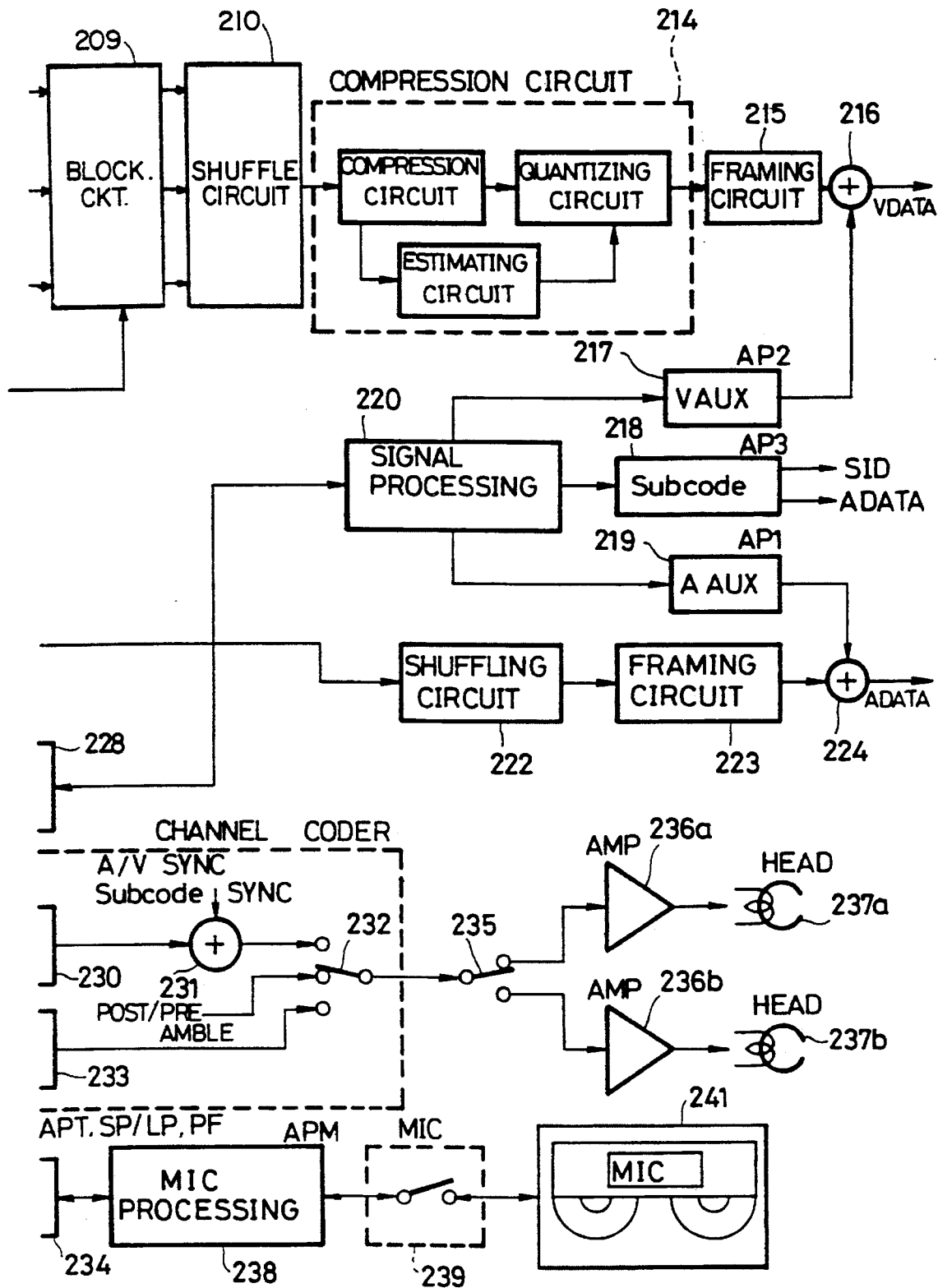

The digital video tape recorder of the present invention will now be described with reference to FIGS. 26, 27A and 27B. FIG. 26 is a block diagram of the recording portion of the digital video tape recorder in which the present invention finds ready application. In the embodiment described herein, an analog video signal is supplied to luminance-chrominance separator 206 through switch 203a from antenna 201 and tuner 202 or external terminal 204. Luminance-chrominance separator 206 supplies three signals through low pass filters 207a, 207b and 207c to analog to digital (A/D) converter 208. A/D converter 208 converts the luminance signal and chrominance signals to digital form. The signals then pass through blocking circuit 209, shuffling circuit 210, compression circuit 214 and framing circuit 215. A video auxiliary (VAUX) signal is added to the resulting compressed digital video in summing circuit 216 to generate signal VDATA. Signal processing circuit 220 and VAUX circuit 217 generate the VAUX signal.

An analog audio signal is supplied to analog to digital (A/D) converter 221 through switch 203b, which receives the analog audio signal from tuner 202 or external terminal 205. A/D converter 221 converts the analog audio signal to digital form. This signal is supplied to shuffling circuit 222 and then framing circuit 223. An audio auxiliary (AAUX) signal is added to the resulting digital audio signal in adder 224. Signal processing circuit 220 and AAUX circuit 219 generate the AAUX signal.

Subcode circuit 218 generates subcode identification signal SID and subcode data SDATA. Signals ADATA, VDATA, SID and SDATA are supplied to time division multiplexor 226. In addition, the audio and video ID's and pre-sync and post-sync data are supplied to time division multiplexor 226. Error code is added to the time division multiplexed signal by circuit 227. A channel coder adds syncs, ITI data, pre-amble data and post-amble data. The ITI data is generated by utilizing the data reproduced from memory in the cassette (MIC) 241. The coded signal is recorded on the cassette by heads 237a and 237b.

Figures 2, 27A:
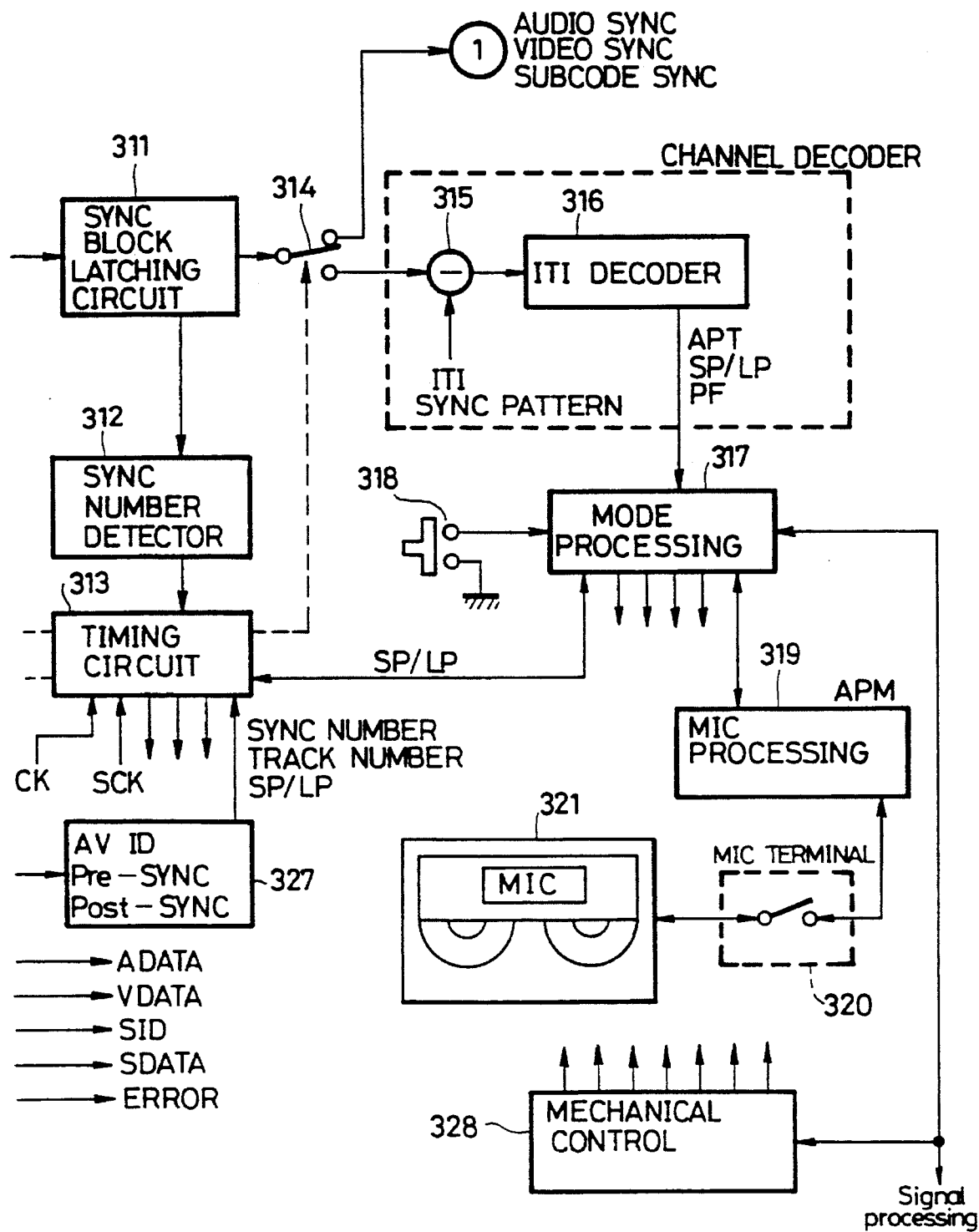
FIGS. 27A and 27B are block diagrams of the reproducing portion of the digital video tape recorder with which the present invention may be used.
Figure 27B:
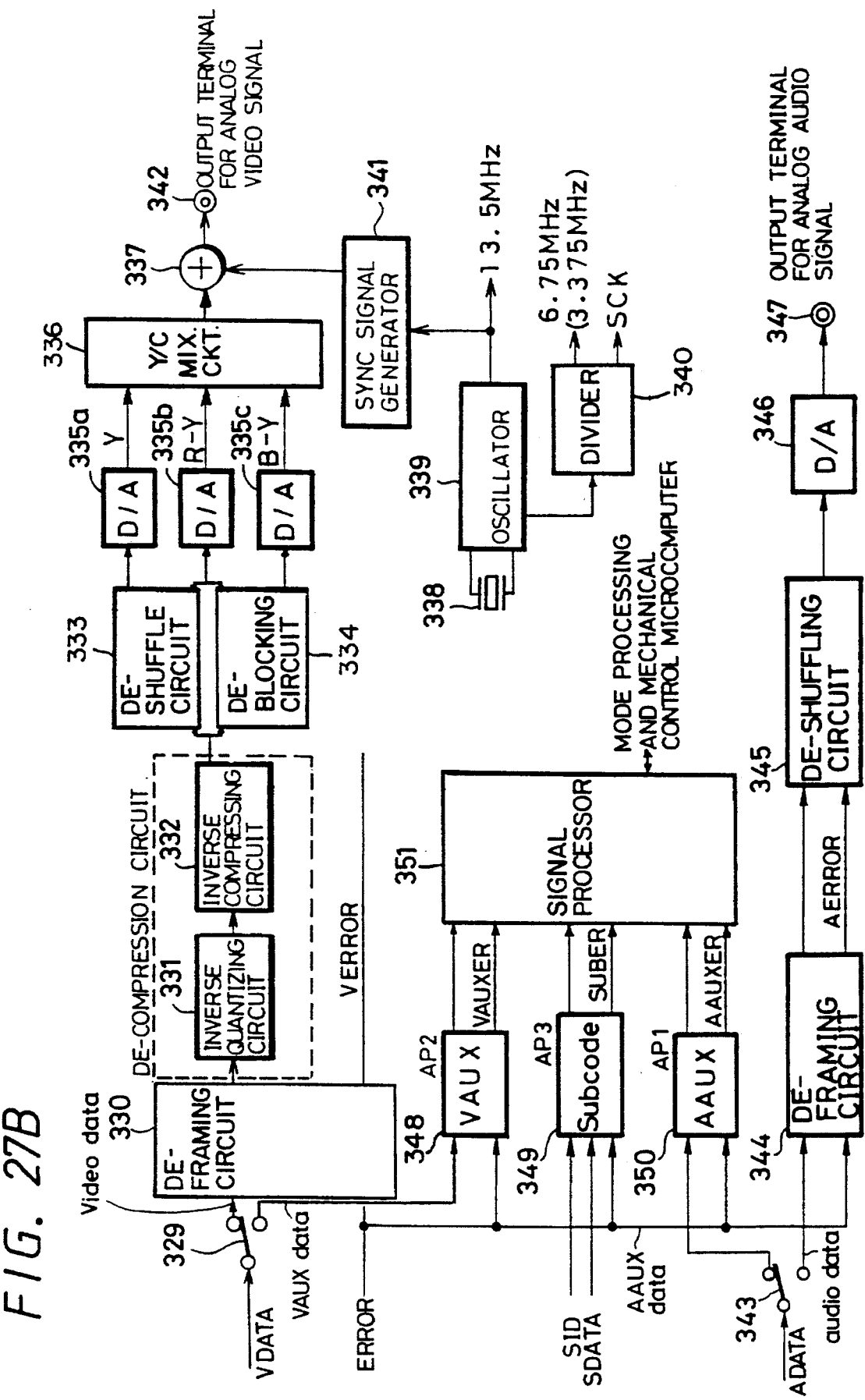

FIGS. 27A and 27B are block diagrams of the reproducing portion of the digital video tape recorder with which the present invention may be used. As shown in FIG. 27A, heads 301a and 301b reproduce the coded signal. The coded signal passes through amplifiers 302a and 302b, switch 303, equalizing circuit 304 and A/D converter 306. Sync pattern detecting circuit 308 identifies the ITI signal, audio signal, video signal and subcode signal. The ITI sync is removed from the ITI signal by circuit 315 and supplied to ITI decoder 316. The audio, video and subcode syncs are removed from the audio, video and subcode signals by circuit 322. These signals are supplied to error correction circuit 325 and signals ADATA, VDATA, SID and SDATA are extracted by time division demultiplexer 326.

Referring to FIG. 27B, VDATA is supplied to de-framing circuit 330, inverse quantizing circuit 331, inverse compression circuit 332, de-shuffling circuit 333 and de-blocking circuit 334. VDATA is then supplied to digital to analog converter 335 and luminance-chrominance mixing circuit 336. A sync signal is added to the analog video signal and supplied as an output at output terminal 342.

Signal ADATA is supplied to de-framing circuit 344, de-shuffling circuit 345 and digital to analog converter 346. The analog audio signal is supplied to output terminal 347.

While the present invention has been particularly shown and described in conjunction with preferred embodiments thereof, it will be readily appreciated by those of ordinary skill in the art that various changes may be made without departing from the spirit and scope of the invention. For example, although the audio, video and subcode areas are recorded and reproduced in this order, the present invention is not limited to this format.

As another example, although the present discussion is directed to recording and reproducing coded video and audio signals, the present invention is not limited solely to video and audio and may be widely applied to other types of signals.

Still further, although specific bit lengths of various signals have been defined in the above described format, other bit lengths may readily and easily be used. For example, application ID signals APT and AP1-3 may have a bit length other than 3 bits and the pack structure is not limited to five bytes.

Therefore, it is intended that the appended claims be interpreted as including the embodiments described herein, the alternatives mentioned above, and all equivalents thereto.

What is claimed is:

1. A record medium having digital video, audio and system data recorded in respective tracks in a predetermined format such that each track contains respective video, audio and subcode areas with each area having a number of sync blocks comprised of a data area in which video, audio and system data, respectively, are recorded preceded by a fixed area in which sync block identifying information is recorded, said data area of said subcode area being formed of data packs having a common pack structure, said system data providing automatic control of a reproducing apparatus during reproduction of said tracks on said record medium and said system data identifying said recorded digital video and audio data, the respective video and audio areas including video auxiliary areas and audio auxiliary areas, respectively, in which system data are recorded, said video auxiliary areas and said audio auxiliary areas being formed of data packs having the common pack structure.

2. The record medium of claim 1, wherein said sync block identifying information identifies the sync block within each track.

3. The record medium of claim 1, wherein the fixed area which precedes the video signal and the fixed area which precedes the audio signal each includes track number data identifying the track within a video frame.

4. The record medium of claim 1, wherein the video auxiliary areas are located in different sync blocks than the video data in the video area.

5. The record medium of claim 1, wherein the audio auxiliary areas precede the audio data in each sync block in the audio area.

6. The record medium of claim 1, wherein the respective video auxiliary, audio auxiliary and subcode data areas of the predetermined format are comprised of a main area for storing system data of a first type and an optional area for storing system data of a first and/or second type.

7. The record medium of claim 6, wherein the system data of the first type stored in said main area is recorded at different locations in successive tracks.

8. The record medium of claim 1, wherein the fixed area which precedes the system data in the subcode area includes track structure identification data identifying the predetermined format of the recorded track.

9. The record medium of claim 1, wherein the fixed area which precedes the system data in the subcode area includes absolute track number data identifying the track on the record medium relative to the beginning of the record medium in which the system data is recorded.

10. The record medium of claim 1, wherein the respective fixed areas in the video, audio and subcode areas include area structure identification data identifying a predetermined format of each respective area.

11. The record medium of claim 1, wherein the common pack structure exhibits a fixed data length.

12. The record medium of claim 1, wherein the common pack structure comprises header data and pack data, the pack data representing selectively different types of system data and the header data identifying the type of system data represented by the pack data.

13. The record medium of claim 12, wherein the header data comprises large item data and small item data, the large item data identifying a group of system data to which the pack data pertains and the small item data identifying data content within the group to which the pack data pertains.

14. The record medium of claim 1, further comprising a housing for the record medium on which said digital video and audio data are recorded; and a memory chip in said housing for storing system data formed of data packs having the common pack structure, said system data stored in said memory chip identifying said recorded digital video and audio data and being reproduced and utilized by said reproducing apparatus during reproduction of tracks on said record medium.

15. The record medium of claim 14, wherein the memory chip in said housing additionally stores text data formed of modified data packs having a variable length pack structure, said text data providing user supplied text identification information of said recorded digital video and audio data.

16. The record medium of claim 1, wherein the record medium is a magnetic tape.

17. The record medium of claim 1, wherein the respective video, audio and subcode areas in the predetermined format further include error correction areas containing error correction code.

18. The record medium of claim 1, wherein the predetermined format further includes an insert and track information area in which timing information for achieving reliable rerecording is recorded.

19. The record medium of claim 18, wherein said insert and track information area further includes track structure identification data identifying the predetermined format of the recorded track.

20. Method of recording video and audio data on a record medium, comprising:

receiving digital video data to be recorded;

receiving digital audio data to be recorded;

arranging said digital video and audio data in a predetermined format for recording, said format including video, audio and subcode areas, each area containing a respective number of sync blocks of data having a data area in which video data, audio data and system data, respectively, are provided, preceded by a fixed area in which is provided sync block identifying information, said data area of said subcode area being formed of data packs having a common pack structure, said system data being provided for automatic control of an apparatus during a recording mode and a playback mode and for identifying said recorded digital video and audio data, the respective video and audio areas including video auxiliary areas and audio auxiliary areas, respectively, in which system data are provided, said video auxiliary areas and said audio auxiliary areas being formed of data packs having the common pack structure;

recording successive tracks on said record medium, each track containing said digital video and audio data in said predetermined format; and automatically controlling said apparatus in accordance with said system data.

21. Apparatus for recording video and audio data on a record medium, comprising:

video input means for receiving digital video data to be recorded;

audio input means for receiving digital audio data to be recorded;

formatting means for arranging said digital video and audio data in a predetermined format for recording, said format including video, audio and subcode areas, each area containing a respective number of sync blocks of data having a data area in which video data, audio data and system data, respectively, are provided, preceded by a fixed area in which is provided sync block identifying information, said data area of said subcode area being formed of data packs having a common pack structure, said system data being provided for automatic control of said apparatus during a recording mode and a playback mode and for identifying said recorded digital video and audio data, the respective video and audio areas including video auxiliary areas and audio auxiliary areas, respectively, in which system data are provided, said video auxiliary areas and said audio auxiliary areas being formed of data packs having the common pack structure;

recording means for recording successive tracks on said record medium, each track containing said digital video and audio data in said predetermined format; and means for automatically controlling said apparatus in accordance with said system data.

22. The apparatus of claim 21, wherein said sync block identifying information identifies the sync block within each track.

23. The apparatus of claim 21, wherein the fixed area which precedes the video signal and the fixed area which precedes the audio signal each includes track number data identifying the track within a video frame.

24. The apparatus of claim 21, wherein the video auxiliary areas are located in different sync blocks than the video data in the video area.

25. The apparatus of claim 21, wherein the audio auxiliary areas precede the audio data in each sync block of the audio area.

26. The apparatus of claim 21, wherein the respective video auxiliary, audio auxiliary and subcode data areas of the predetermined format are comprised of a main area for storing system data of a first type and an optional area for storing system data of a first and/or second type.

27. The apparatus of claim 26, wherein the system data of the first type stored in said main area is recorded at different locations of a track in successive tracks.

28. The apparatus of claim 21, wherein the fixed area which precedes the system data in the subcode area includes track structure identification data identifying the predetermined format of the recorded track.

29. The apparatus of claim 21, wherein the fixed area which precedes the system data in the subcode area includes absolute track number data identifying the track on the record medium relative to the beginning of the record medium in which the system data is recorded.

30. The apparatus of claim 21, wherein the respective fixed areas in the video, audio and subcode areas include area structure identification data identifying a predetermined format of each respective area.

31. The apparatus of claim 21, wherein the common pack structure exhibits a fixed data length.

32. The apparatus of claim 21, wherein the common pack structure comprises header data and pack data, the pack data representing selectively different types of system data and the header data identifying the type of system data represented by the pack data.

33. The apparatus of claim 32, wherein the header data comprises large item data and small item data, the large item data identifying a group of system data to which the pack data pertains and the small item data identifying data content within the group to which the pack data pertains.

34. The apparatus of claim 21, further comprising a housing for the record medium on which said digital video and audio data are recorded; a memory chip in said housing for storing system data formed of data packs having the common pack structure, said system data stored in said memory chip identifying said recorded digital video and audio data; and means for reproducing and utilizing the system data stored in said memory chip.

35. The apparatus of claim 34, further comprising means for writing the system data into said memory chip.

36. The apparatus of claim 34, wherein the memory chip in said housing additionally stores text data formed of modified data packs having a variable length pack structure, said text data providing user supplied text identification information of said recorded digital video and audio data.

37. The apparatus of claim 21, wherein the record medium is a magnetic tape.

38. The apparatus of claim 21, wherein the respective video, audio and subcode areas in the predetermined format further include error correction areas containing error correction code.

39. The apparatus of claim 21, wherein the predetermined format further includes an insert and track information area in which timing information for achieving reliable rerecording is provided.

40. The apparatus of claim 39, wherein said insert and track information area further includes track structure identification data identifying the predetermined format of the recorded track.

41. The apparatus of claim 21, further comprising reproducing means for reproducing successive tracks from said record medium, each track containing said digital video data and audio data and said system data in said predetermined format.

42. The apparatus of claim 41, wherein said formatting means replaces said reproduced system data that is inconsistent with said predetermined format with other system data which is indicative of an absence of information when said digital video and audio data are recorded in said predetermined format.

* * * * *